US010353215B2

(12) United States Patent
Chen et al.

(10) Patent No.: US 10,353,215 B2
(45) Date of Patent: *Jul. 16, 2019

(54) GENERATION OF CODED STRUCTURED LIGHT PATTERNS USING VCSEL ARRAYS

(71) Applicant: Princeton Optronics, Inc., Mercerville, NJ (US)

(72) Inventors: Tong Chen, Bell Mead, NJ (US); Chuni Ghosh, West Windsor, NJ (US); Laurence Watkins, Pennington, NJ (US)

(73) Assignee: Princeton Optronics, Inc., Mercerville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,563

(22) Filed: Mar. 13, 2018

(65) Prior Publication Data

US 2018/0203247 A1   Jul. 19, 2018

Related U.S. Application Data

(63) Continuation of application No. 15/288,129, filed on Oct. 7, 2016, now Pat. No. 9,946,089.
(Continued)

(51) Int. Cl.
*G02B 27/42* (2006.01)
*H04N 13/254* (2018.01)
(Continued)

(52) U.S. Cl.
CPC ............ *G02B 27/425* (2013.01); *F21V 5/004* (2013.01); *F21V 5/005* (2013.01); *F21V 5/008* (2013.01);
(Continued)

(58) Field of Classification Search
CPC .. G03B 21/28; G03B 21/142; G03B 21/2033; G02B 27/09; G02B 27/30; G02B 27/126; G02B 27/425; G02B 27/0944
See application file for complete search history.

(56) References Cited

U.S. PATENT DOCUMENTS 5,325,386 A   6/1994   Jewell et al.
6,888,871 B1   5/2005   Zhang et al.
(Continued)

FOREIGN PATENT DOCUMENTS

KR   20120061002   6/2012
WO   WO 2008/120217   10/2008
(Continued)

OTHER PUBLICATIONS

U.S. Appl. No. 61/985,776, filed Apr. 29, 2014, Wang et al.
European Search Report issued in European Application No. 16857993.6 dated Jun. 7, 2019, 11 pages.

*Primary Examiner* — Sultan Chowdhury
(74) *Attorney, Agent, or Firm* — Fish & Richardson P.C.

(57) ABSTRACT

A coded pattern projector apparatus comprises a surface-emitting array of emitters comprising a plurality of emitters where each of the plurality of emitters generates one of a plurality of optical beams in response to an electrical drive signal applied to a respective electrical input of each of the plurality of emitters. A first optical element projects each the plurality of optical beams generated by the surface-emitting array of emitters. A second optical element collimates the plurality of optical beams in a first dimension and diverges the plurality of optical beams in a second dimension such that the plurality of optical beams form at least one stripe patterns. A controller has electrical outputs, each of the electrical outputs is connected to a respective electrical input
(Continued)

of each of the plurality of emitters. The controller generates electrical drive signals that produce a coded stripe pattern.

12 Claims, 28 Drawing Sheets

Related U.S. Application Data

(60) Provisional application No. 62/244,397, filed on Oct. 21, 2015.

(51) Int. Cl.

| | | |
|---|---|---|
| *G03B 21/20* | (2006.01) | |
| *G06T 7/521* | (2017.01) | |
| *F21V 5/00* | (2018.01) | |
| *F21V 5/04* | (2006.01) | |
| *G01S 17/08* | (2006.01) | |
| *G02B 3/00* | (2006.01) | |
| *G02B 27/12* | (2006.01) | |
| *G02B 27/30* | (2006.01) | |
| *G06K 9/00* | (2006.01) | |
| *G01S 7/481* | (2006.01) | |
| *G02B 27/46* | (2006.01) | |
| *G06K 9/20* | (2006.01) | |
| *H04N 13/207* | (2018.01) | |
| *F21Y 115/30* | (2016.01) | |
| *F21Y 115/10* | (2016.01) | |

(52) U.S. Cl.
CPC ............... *F21V 5/04* (2013.01); *F21V 5/043* (2013.01); *G01S 7/4815* (2013.01); *G01S 17/08* (2013.01); *G02B 3/0037* (2013.01); *G02B 27/12* (2013.01); *G02B 27/126* (2013.01); *G02B 27/30* (2013.01); *G02B 27/46* (2013.01); *G03B 21/2033* (2013.01); *G06K 9/00335* (2013.01); *G06K 9/2036* (2013.01); *G06T 7/521* (2017.01); *H04N 13/207* (2018.05); *H04N 13/254* (2018.05); *F21Y 2115/10* (2016.08); *F21Y 2115/30* (2016.08)

(56) References Cited

U.S. PATENT DOCUMENTS

| | | |
|---|---|---|
| 7,687,757 B1 | 3/2010 | Tseng et al. |
| 7,916,932 B2 | 3/2011 | Lee |
| 8,150,142 B2 | 4/2012 | Freedman et al. |
| 8,320,621 B2 | 11/2012 | McEldowney |
| 8,384,997 B2 | 2/2013 | Shpunt et al. |
| 8,530,039 B2 | 9/2013 | Adair et al. |
| 8,675,706 B2 | 3/2014 | Seurin et al. |
| 8,749,796 B2 | 6/2014 | Pesach et al. |
| 8,783,893 B1 | 7/2014 | Seurin et al. |
| 9,048,633 B2 | 6/2015 | Gronenborn et al. |
| 9,553,423 B2 | 1/2017 | Chen et al. |
| 2007/0071056 A1 | 3/2007 | Chen |
| 2007/0273957 A1 | 11/2007 | Zalevsky |
| 2011/0297975 A1 | 12/2011 | Yeh et al. |
| 2012/0140094 A1 | 6/2012 | Shpunt et al. |
| 2012/0307075 A1 | 12/2012 | Margali |
| 2013/0038941 A1 | 2/2013 | Pesach et al. |
| 2013/0044187 A1 | 2/2013 | Hammes et al. |
| 2013/0058071 A1 | 3/2013 | Ben Moshe |
| 2013/0163627 A1 | 6/2013 | Seurin et al. |
| 2013/0266326 A1 | 10/2013 | Joseph et al. |
| 2014/0376092 A1 | 12/2014 | Mor |
| 2015/0130932 A1 | 5/2015 | Vredenburg et al. |
| 2015/0260830 A1 | 9/2015 | Ghosh et al. |
| 2017/0075205 A1* | 3/2017 | Kriman ............. G03B 21/2066 |

FOREIGN PATENT DOCUMENTS

| | | |
|---|---|---|
| WO | WO 2009/153446 | 12/2009 |
| WO | WO2009/153446 | 12/2009 |
| WO | WO 2014/102341 | 7/2014 |
| WO | 2015/059705 A1 | 4/2015 |

\* cited by examiner

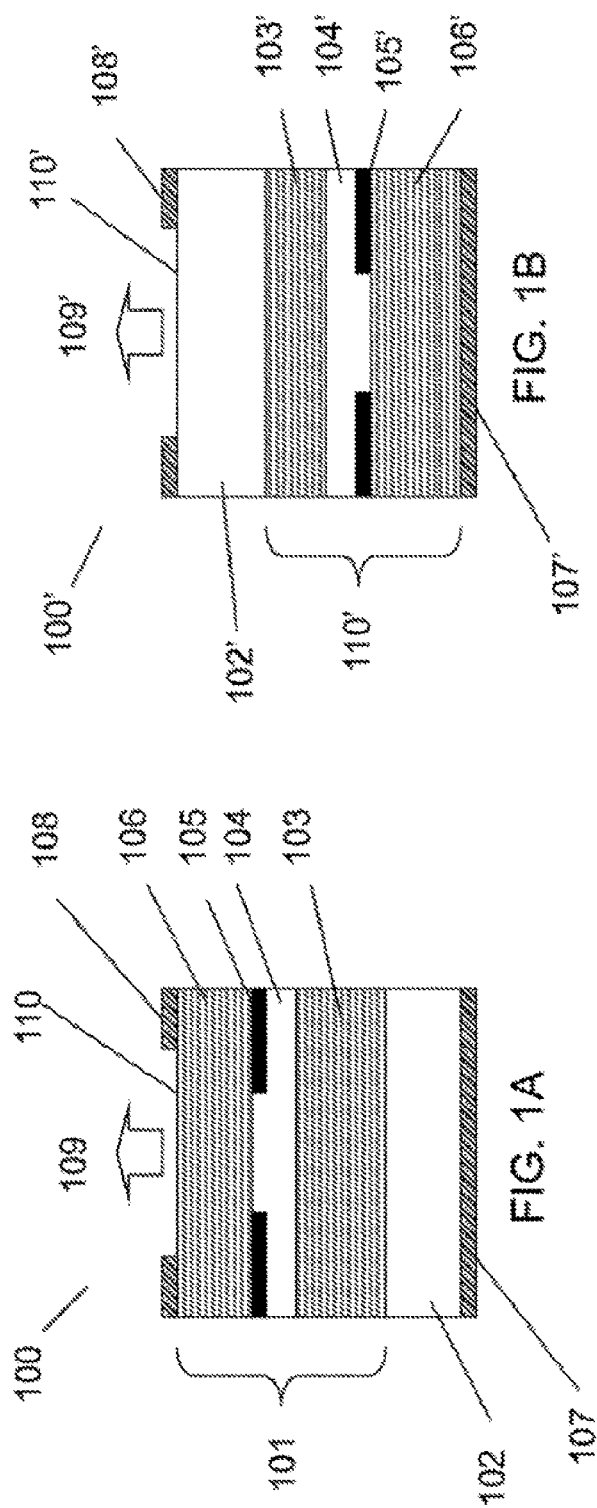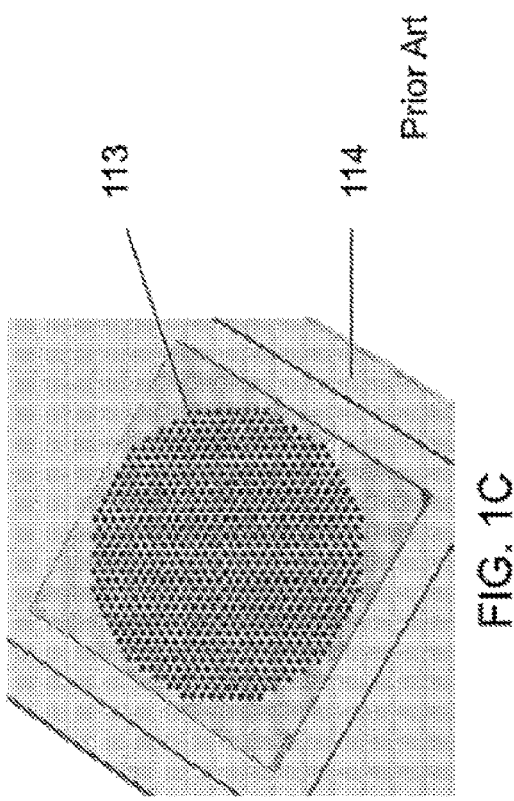

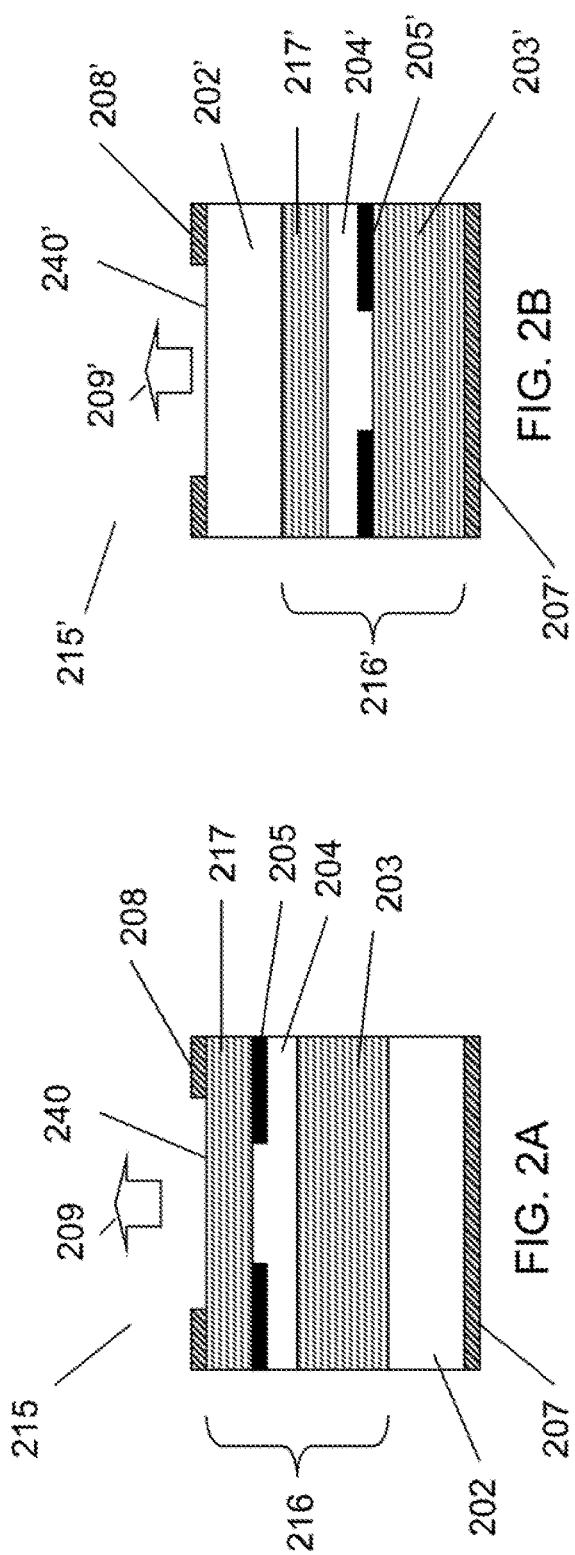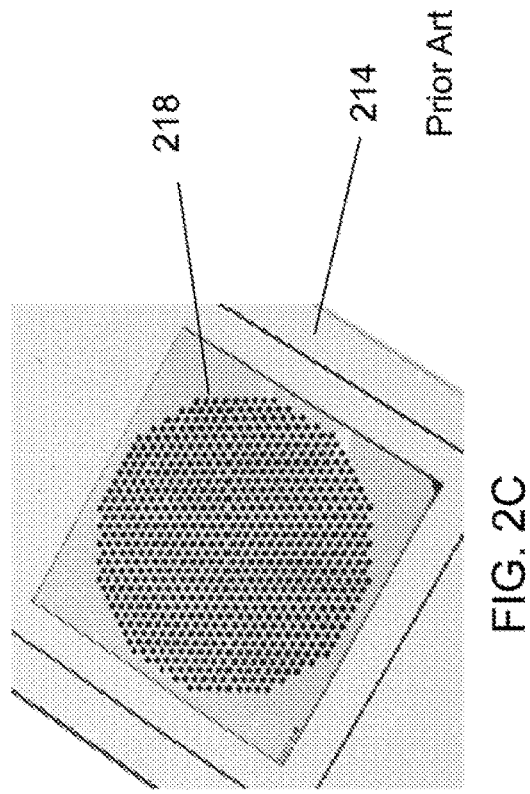

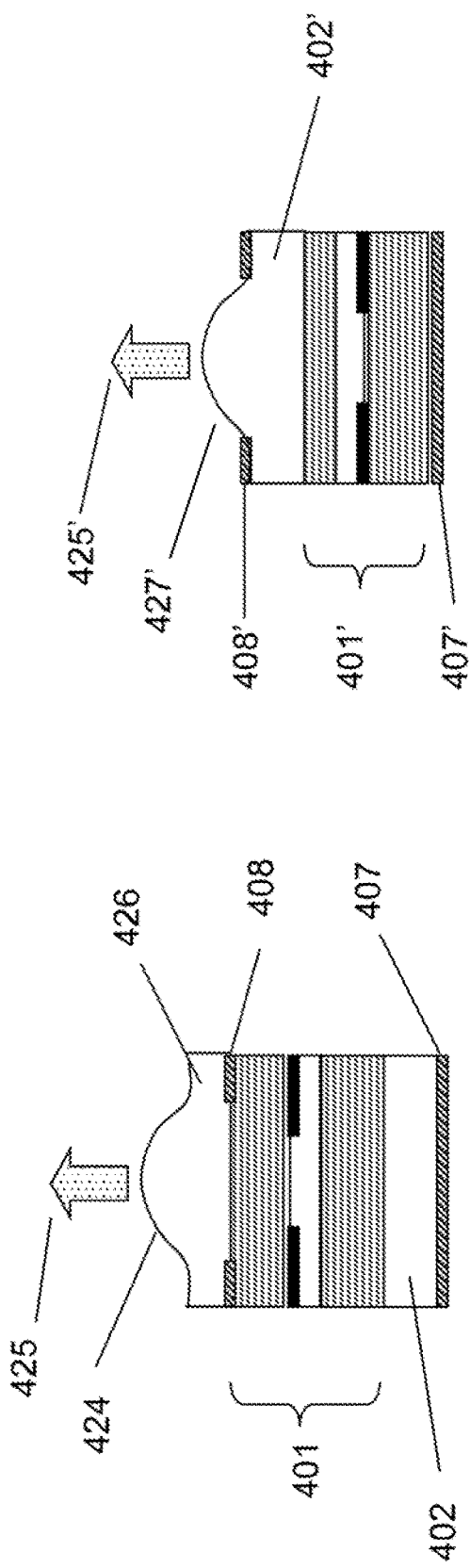
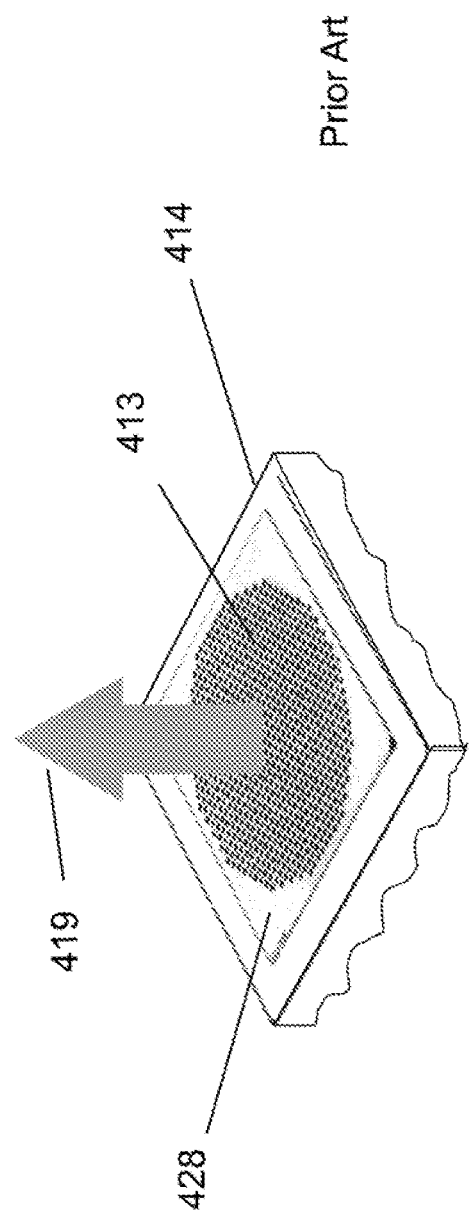
FIG. 4A
FIG. 4B
FIG. 4C Prior Art

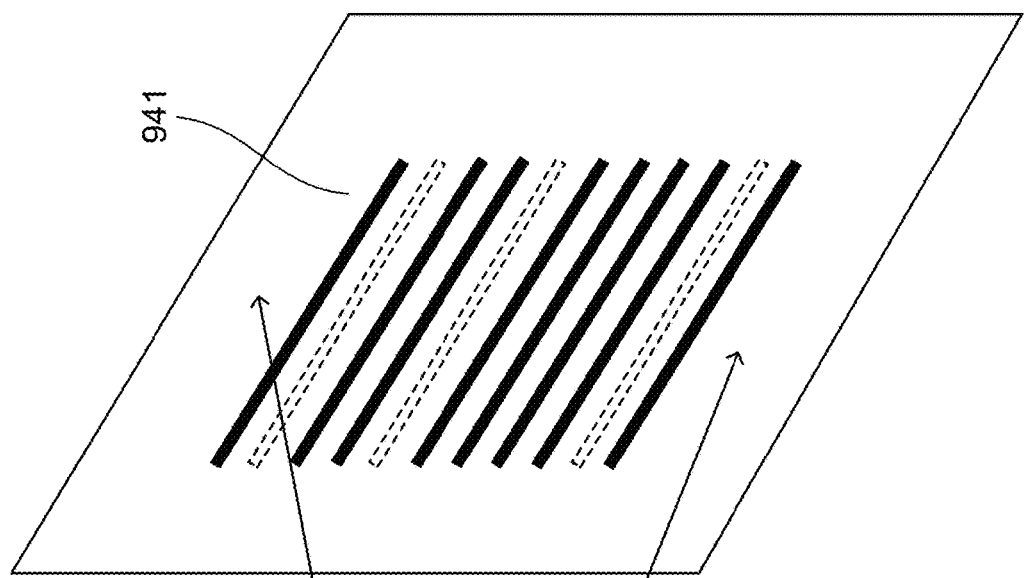
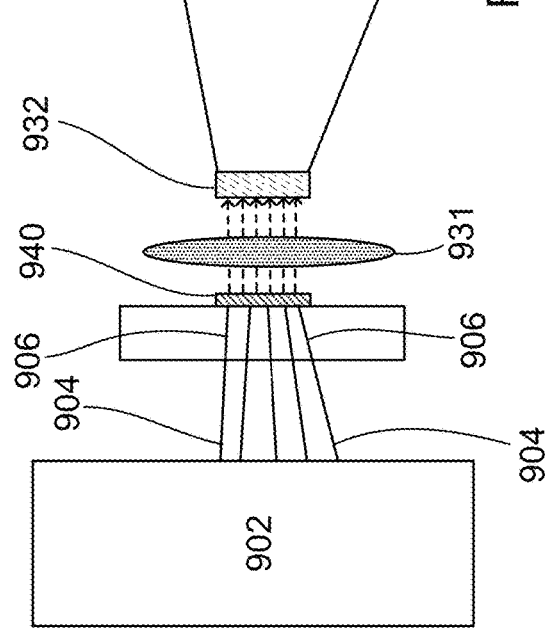
FIG. 9A
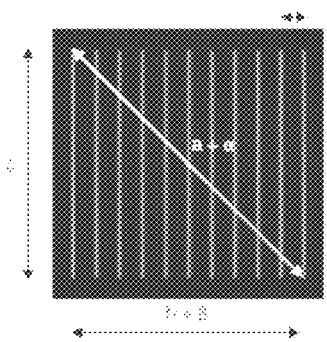
FIG. 9B

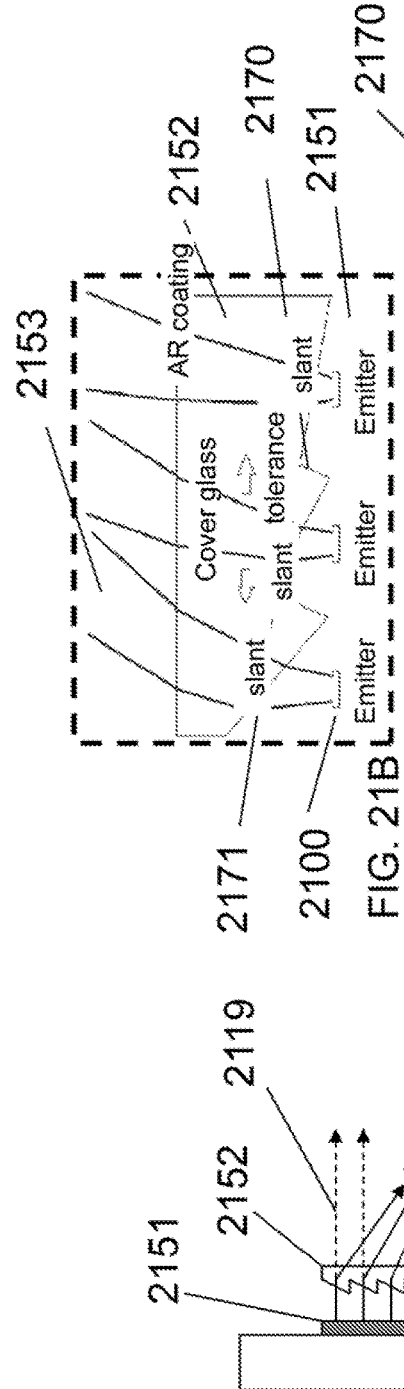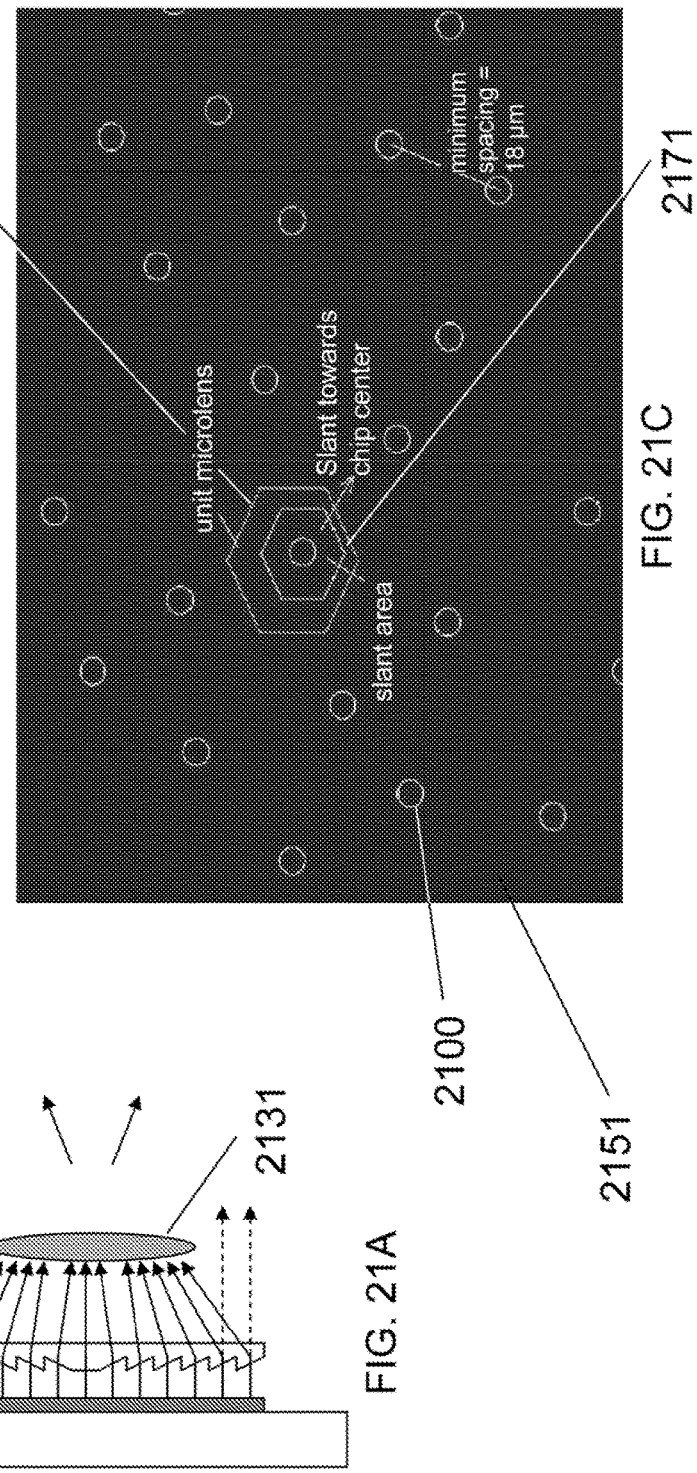
FIG. 21A
FIG. 21B
FIG. 21C

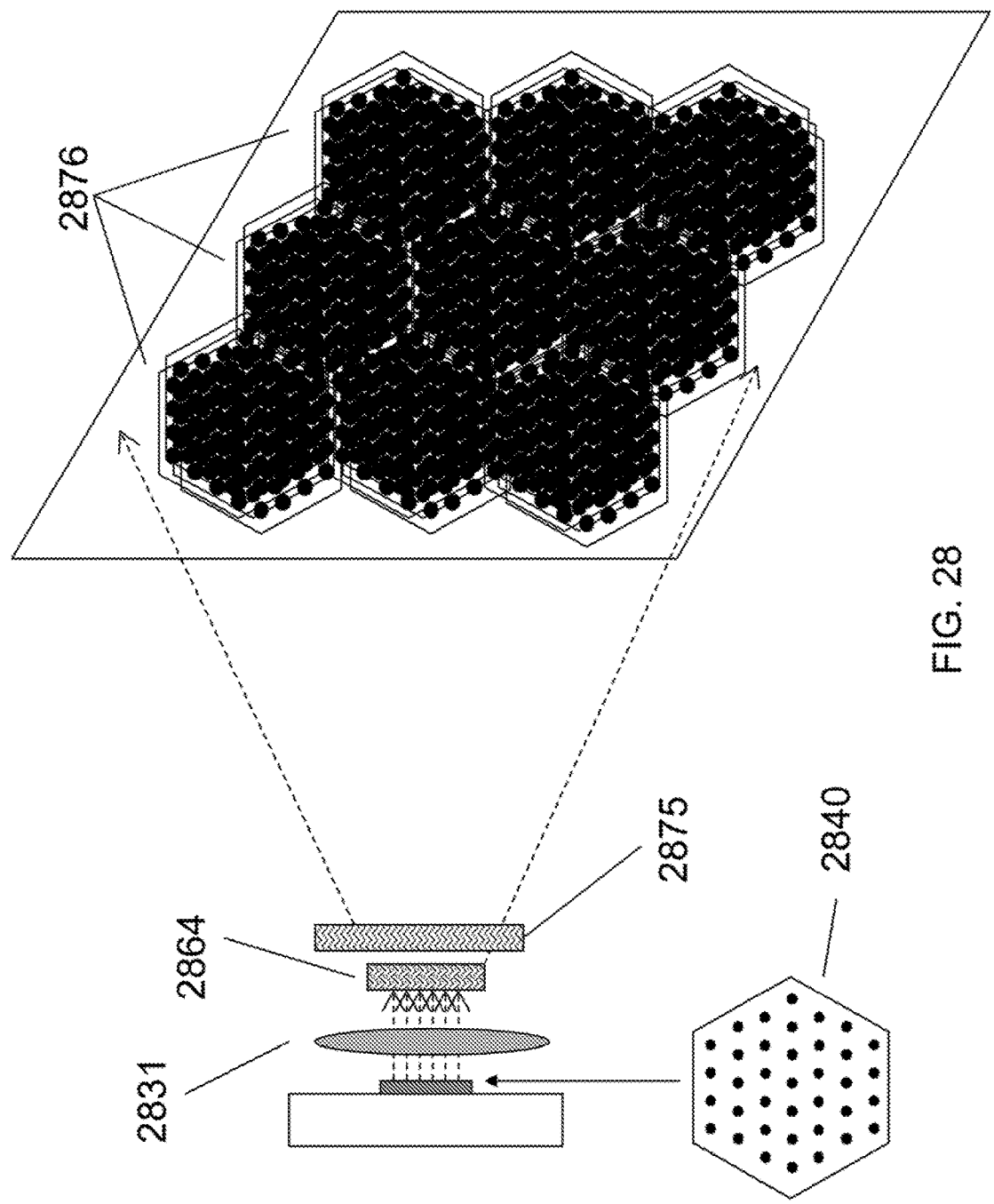

GENERATION OF CODED STRUCTURED LIGHT PATTERNS USING VCSEL ARRAYS

CROSS REFERENCE TO RELATED APPLICATION

This application is a continuation of U.S. patent application Ser. No. 15/288,129, filed on Oct. 7, 2016, which claims the benefit of U.S. Provisional Application No. 62/244,397, filed on Oct. 21, 2015. The entire contents of each of these prior applications is incorporated hereby by reference in their entirety.

INTRODUCTION

Many imaging applications benefit from illumination systems that generate structured light. When light of a known pattern of structured light is projected onto a scene, the deformation of the pattern provides a variety of surface and depth information about the objects in the scene. For example, optical systems, such as those used for 3D imaging and gesture recognition applications, use coded pattern projection. To meet the growing demand for optical systems that use structured light, improvements are required in structured light illumination sources and methods.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 1A illustrates an embodiment of the material structure of a top-emitting VCSEL element used to generate coded patterns of the present teaching.

FIG. 1B illustrates an embodiment of the material structure of a bottom-emitting VCSEL element used to generate coded patterns of the present teaching.

FIG. 1C illustrates a top view of an embodiment of a two-dimensional VCSEL device configured as a monolithic array.

FIG. 2A illustrates an embodiment of a top-emitting RC-LED element used to generate the coded patterns of the present teaching.

FIG. 2B illustrates an embodiment of a bottom-emitting RC-LED element used to generate the coded patterns of the present teaching.

FIG. 2C illustrates a top view of an embodiment of a two-dimensional RC-LED device configured as a monolithic array.

FIG. 4A illustrates a structure of a top-emitting array element with integrated microlens.

FIG. 4B illustrates a structure of a bottom-emitting array element with integrated microlens.

FIG. 4C illustrates a surface-emitting array with the integrated microlens array monolithically integrated onto a common substrate.

FIG. 9A illustrates an embodiment of a coded pattern projector apparatus of the present teaching that generates an array of multiple stripes and projects it into a region.

FIG. 9B illustrates a photograph of the array of stripes generated by the arrangement illustrated in FIG. 9A in a bench top experiment.

FIG. 21A illustrates an embodiment of the coded pattern projector apparatus comprising a micro-optic prism array of the present teaching.

FIG. 21B is a close-up view of the embodiment of the present teaching illustrated in FIG. 21A.

FIG. 21C is a top view of the embodiment of the present teaching illustrated in FIG. 21A.

FIG. 28 illustrates an embodiment of the coded pattern projector of the present teaching that projects multiple fully-filled coded two-dimensional pattern structures into a large area.

DESCRIPTION OF VARIOUS EMBODIMENTS

Figure 3:
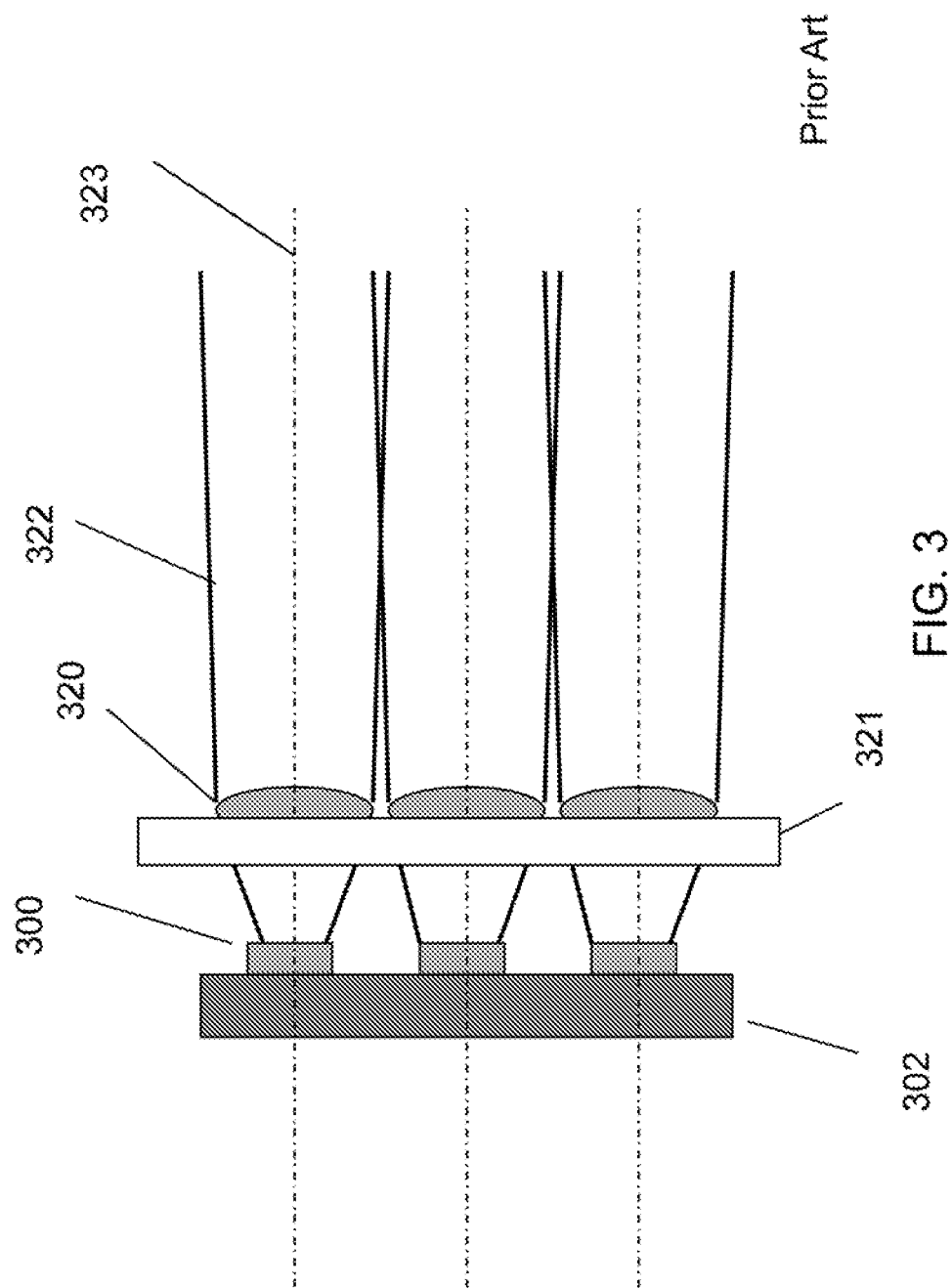
FIG. 3 illustrates a surface-emitting array with microlens.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

The present teaching relates to a method and apparatus for projecting coded sequences of structured illumination. Structured light, or structured illumination, refers to light formed in various patterns and projected in a particular region that is being imaged or sensed by a sensing system. The light patterns projected into a region have a particular spatial pattern. The particular spatial patterns projected into a region can include stripe patterns, spot patterns, and fringe patterns. The spatial patterns projected into a region may have regions that are dark or not illuminated surrounding the illuminated areas, or they may be nominally all light, or so-called fully-filled patterns. The light patterns may be regular or irregular. The light patterns may extend in one or two dimensions. Although some embodiments described in the present teaching disclose particular patterns, persons skilled in the art will appreciate that the present teaching is not limited to the particular patterns described herein.

It is desirable for light sources that generate structured light to be efficient, bright, easy to shape, and have high reliability. It is also desirable for light sources that generate structured light to be capable of being modulated at high rates, and operated at high temperatures. The coded pattern projector apparatus and method of the present teaching uses surface-emitting array technology to generate illumination. Surface-emitting arrays generate patterns of optical beams from a surface of the device. The surface-emitting arrays may be addressable arrays. Addressable arrays allow individual elements of the array, or groups of elements in the array, to be independently electrically controlled. For example, the present teaching projects coded sequences of structured images using light beams emitted from vertical-cavity surface-emitting laser (VCSEL) arrays or resonant cavity light emitting diodes (RC-LED) arrays. The coded pattern projector apparatus and method of the present teaching can be used for optical systems such as in 3D imaging and gesture recognition applications. In addition, there are many emerging applications in the areas of sensing and 3D imaging that will benefit from the availability of RC-LEDs and low-cost high-brightness VCSELs.

VCSELs have many beneficial properties over other lasers, especially edge emitting semiconductor lasers. VCSELs can generate round beams or other shaped beams of radiation with good collimation for many different wavelengths. They are stable with small changes in wavelength with changing operating temperatures, are able to operate at high temperatures and have very high long-term reliability. The VCSELs can be operated at high speed pulse rates with very short pulses and very fast pulse rise times resulting from gain switching, relaxation resonance properties.

Resonant Cavity LEDs (RC-LEDs) are surface emitting devices that are similar to VCSELs except they have lower performance parameters since they are light emitting diodes (LEDs) and not lasers. The RC-LEDs have improved characteristics compared to regular LEDs by virtue of a resonant cavity which reduces the linewidth and improves the output beam collimation. The resonant cavity of the RC-LED has a lower quality factor (Q factor) than the cavity of the VCSEL so that the RC-LED does not lase.

One feature of the VCSELs and RC-LEDs of the present teaching is that they can be manufactured in volume. Surface emitting devices such as VCSELs and RC-LEDs are highly suitable for high-volume production processes. Furthermore, recent innovations in VCSEL design which positions all electrical contacts on one side of the device have made them highly compatible with electronics surface mount assembly technology. These and many other configurations are possible and more details are disclosed in a U.S. Pat. No. 8,675,706 to Seurin et al. and a pending U.S. patent application Ser. No. 13/337,098 to Seurin et al., filed on Dec. 24, 2011. The entire contents of this patent and patent application are incorporated herein by reference. This patent and patent application are co-owned by Princeton Optronics Inc. Mercerville, N.J., the assignee of the present application.

The basic two-mirror VCSEL can only operate with very low power in low-order or single transverse mode. Operating the VCSEL at higher power results in multimode operation so that although the laser beam power is increased, the brightness of the beam is not increased. One method of increasing the brightness is to use a third mirror to operate the VCSEL in a three-mirror configuration, which increases the resonant cavity length enabling operation in a low order mode at higher power. In this configuration, the power is determined by the gain and power capacity of the quantum wells in the gain section.

In some embodiments, the high-brightness VCSELs of the present teaching operate in a single controlled polarization, which is normally linear. Some VCSELs operate in multiple polarizations, or in a single polarization in which the orientation of the polarization is random and can change under different operating conditions. It is possible to control the polarization orientation of a single VCSEL or an entire VCSEL array by introducing some form of birefringence into the resonant cavity. Birefringence may be achieved through various methods, including changing the aperture shape, introducing refractive index birefringence, or using some form of linear grating written on the VCSEL emission area.

Various three-dimensional imaging applications use structured light. The structured illumination results in unique illumination patterns in different regions of the scene. A camera may be placed off axis and used to record the composite structured image. Suitable analysis of the composite image in relation to the projected structure provides a determination of the image of the scene as well as depth information for the objects in the region. Another method to realize three-dimensional imaging applications using structure light is stereoscopic imaging. In stereoscopic imaging, two cameras are used to view the object using structured light illumination and the three-dimensional aspect is generated by proper algorithms much the same way as a pair of human eyes creates the three-dimensional effect for humans.

Various structured imaging approaches to 3D imaging and gesture recognition use a fixed pattern structure which is defined by a diffractive optical element (DOE). Alternatively, a surface-emitting array configuration is used to define the pattern structure. Distortions of the image recorded by an offset sensor are analyzed in relation to the projected illumination structure to determine the depth and movement of objects in the illuminated scene. Modifications of the approach using a surface-emitting array configuration include dividing the surface-emitting array elements into subgroups of array elements and having each subgroup activated separately or in multiple subgroups. Using subgroups of array elements provides more flexibility in illuminating partial regions of a scene such that particular areas of interest at any specific time can be examined more closely.

The use of subgroups of array elements is described in PCT Publication No. WO 2009153446 A2 authored by Sylvain Becker et al., published Jun. 12, 2008. In this publication, subgroups of surface-emitting arrays are activated in sequence to reduce laser speckle effects and improve the sensitivity and resolution of 3D imaging. The structured light patterns are generated by DOE masks and the resulting structures are fringes but other more complex forms are also described.

Another example of prior art that describes using subgroups of array elements to generate structure light is U.S. Patent Application Publication No. US 20140376092 A1 to Zafrir Mor, published Dec. 25, 2014. In this application, the author describes a surface emitting diode array in which each column of array elements is activated separately. The light from a column of elements is propagated through a DOE or a cylindrical lens to form a stripe of illumination. The stripe of illumination is projected by a lens into a region.

Thus, when all the columns are illuminated, an array of stripes is generated and projected into a region. The columns, individually or in groups, are activated in sequence to generate a sequence of different stripe illumination patterns. Thus, a sequence of coded illumination structures can be formed and used for 3D imaging, depth measurement or gesture recognition. A second DOE is also described that can be used to multiply the images to provide wider coverage of the illumination scene or region.

Surface-emitting arrays, including surface-emitting laser diode arrays, comprise a regular or non-regular 2D array of individual devices which each propagate a beam with a fixed predetermined diameter. The individual surface-emitting array devices are separated by a distance that is determined by factors such as thermal heat dissipation, electrical input contact pads and connections etc. As a result, the beams are typically spaced from one another by three or more times the beam diameter of each beam. As a consequence, the resulting structure patterns described in the prior art references are spot or line patterns with significant sized non-illuminated regions in between.

One feature of the coded pattern projector apparatus and method of the present teaching is that the sequence of coded structured patterns may be either one-dimensional fringes or two-dimensional coded spot patterns. These shapes of the coded structure patterns provide a more flexible and higher resolution 3D imaging or gesture recognition illumination system. An additional feature of the coded pattern projector apparatus and method of the present teaching is that the surface-emitting arrays are configured with DOE or asymmetric optics to form patterns without gaps between pattern features. This ensures full illumination coverage for very high-resolution imaging. An additional feature of the coded pattern projector apparatus and method of the present teaching is that DOE masks are used to multiply the coded patterns to increase the field or view of the illumination.

In some embodiments, one or more sensors may be located off-axis to record light reflected from objects in the region. The number and location of the sensors depends on the imaging approach. Analysis of this recorded image in relation to the parameters of the structured light emission pattern enables the determination of three-dimensional information about the objects in the region.

Various embodiments of VCSEL devices are used in the coded pattern projector apparatus and method of the present teaching. In some embodiments, the VCSEL device includes a first semiconductor multilayer distributed Bragg reflector (DBR) mirror on the top and a second multilayer DBR mirror on the bottom that form the laser resonant cavity. A gain region is positioned in between the first and second mirrors. The gain region may include a group of quantum wells and an aperture. The aperture confines the activation current in the central region to maximize gain in the quantum wells in the same area as the optical mode of the cavity. The aperture also restricts the optical mode to that region. The aperture size in relationship with the other properties of the laser resonant cavity determines the transverse mode properties. Transverse mode properties include single-mode versus multimode, and other features.

In some embodiments, the VCSEL structure comprises multiple epitaxially grown layers on a substrate. Electrical contact inputs are formed on the top and bottom surfaces for current injection. One of the mirrors is made partially transmitting to enable emission of the output laser beam.

The gain and power capacity of the VCSEL device can be increased by providing multiple groups of quantum wells. Each group of quantum wells has an associated aperture to confine the current and the optical mode in the same region. This results in high gain and power transfer into the optical mode. In some embodiments, a tunnel diode element is situated between each group of quantum wells. The tunnel diode element transmits the charge carriers. The tunnel diode allows carriers to tunnel through the p-n junction of the tunnel diode. The technology for arrays of high brightness VCSELs have been disclosed in U.S. Provisional Patent Application Ser. No. 61/985,776, filed Apr. 29, 2014 to Seurin et al. The entire contents of this provisional application are incorporated herein by reference. This provisional application is also assigned to Princeton Optronics Inc. Mercerville, N.J., the assignee of the present application.

The use of more quantum well groups increases the power in the VCSEL in both single-mode and multimode configurations. However to restrict the operation to single-mode, the aperture(s) have to be small diameter so that the higher order modes are attenuated. In order to further increase the power in single-mode operation and increase the brightness, the laser cavity parameters have to be changed to increase the single-mode diameter to draw power from a larger volume of the multiple groups of quantum wells. One of the cavity parameters that achieve this is the cavity length. Increasing the cavity length increases the diameter of the lasing modes and results in a larger aperture that can be used to control single-mode operation, thus increasing the gain volume to obtain higher power and brightness.

The VCSEL cavity length is increased by introducing a third mirror which can be placed a significant distance away from the VCSEL epitaxial two mirror structure. The combination of the intermediate DBR mirror and the third mirror forms an equivalent mirror for the laser cavity and increases the cavity length to the distance between the third mirror and the other VCSEL DBR mirror. Several embodiments of the three mirror cavity can be formed which either use a separate mirror, a mirror which is bonded directly to the VCSEL substrate or by depositing a mirror coating on the VCSEL substrate surface opposite the VCSEL epitaxial structure.

The combination of the multiple groups of quantum wells in the gain region and the use of the three-mirror resonant cavity structure increases the single-mode power and thus the brightness of VCSEL devices by more than two orders of magnitude. The use of a third mirror to increase the brightness of a VCSEL element is equally applicable to arrays of VCSEL elements and a single mirror can be used as the third mirror for all the elements of the array.

The optical mode of a single VCSEL element or an array of VCSEL elements will lase with random polarization unless there is some residual optical anisotropy, or birefringence, to cause it to lase in a controlled linear polarization. One approach that is known in the state of the art is to use an elliptical aperture or similar means to cause sufficient anisotropy in the VCSEL resonant cavity to force a linear polarized mode. Other methods such as using polarization restricting mirrors, gratings or components with external cavity VCSELs can also be used.

Various embodiments of RC-LED devices are used in the coded pattern projector apparatus and method of the present teaching. In some embodiments, a RC-LED device comprises a first semiconductor multilayer DBR mirror on the top and a second multilayer DBR mirror on the bottom. The first and second mirrors form a resonant cavity. A gain region is positioned in between the mirrors that include a group of quantum wells and, optionally, an aperture. The aperture confines the activation current in the central region to increase gain in the quantum wells. The aperture also restricts the optical mode to that region. In the RC-LED, the top first semiconductor DBR mirror has lower reflectivity than the top first semiconductor mirror of a VCSEL. Specifically, the top first semiconductor mirror has low enough reflectivity to prevent any laser action. The resonant cavity acts to narrow the linewidth of the spontaneous emission from the quantum wells by increasing the loss for light with wavelengths not resonant with the cavity.

The light with wavelengths that are resonant with the cavity bounces back and forth in the cavity and is amplified by the quantum wells. Light that is not captured by the DBR reflectors either propagates out of the cavity, propagates out of the substrate, or is absorbed in the substrate. Emission from wavelengths that are not resonant with the cavity is attenuated in the cavity. A portion of the amplified spontaneous emission in the cavity is emitted by the output DBR as a beam of non-coherent radiation. Since the beam is non-coherent there is much less speckle in the light reflected from objects in the region.

The RC-LED structure is similar to the VCSEL structure and typically comprises multiple epitaxial grown layers on a substrate. Electrical contact inputs are formed on the top and bottom surfaces for current injection. One of the DBR mirrors is made partially transmitting to enable emission of the output beam.

The gain and power capacity of the RC-LED device can be increased in a similar manner to the VCSEL by providing multiple groups of quantum wells. Each group of quantum wells has an associated aperture to confine the current and the optical mode in the same region to obtain high gain and power transfer into the optical mode. A tunnel diode in between each group of quantum wells transmits the charge carriers. A tunnel diode allows carriers to tunnel through the p-n junction.

The surface-emitting array layout may be configured as single devices, a linear array of devices, or two-dimensional groups of devices. These various devices and groups of devices may be separately activated. The orientation of the various configurations of devices is aligned to the DOE or asymmetric lens such that the projected image of adjacent pattern elements partially overlap. This causes adjacent images to coalesce into larger uniform images. In some embodiments, a second DOE is used to multiply the patterns. In some embodiments, the multiple patterns are interleaved so that adjacent interleaved images overlap. In these embodiments, the illumination from activated elements coalesces into a single larger pattern element. In some embodiments, the two-dimensional groups of emitter devices extend in two-dimensions. These embodiments generate sequentially coded patterns of spots in which adjacent spots overlap. This results in full, two-dimensional coverage in the illumination region.

Very complex structured patterns can be created using large sized dense packed VCSEL arrays. The large-sized VCSEL arrays can have lateral dimension of up to 10 mm. In some embodiments, the VCSEL array dimensions may be larger than the diameter of many of the lenses and DOEs used to project the patterns. This would especially be the case for small systems designed for mobile devices such as mobile phones and computer tablets. In some embodiments of the present teaching, a micro-optic prism array is used to converge the VCSEL output beams so they pass through the smaller aperture optical components. The micro-optic prism array can also be used with DOEs to form even larger arrays of lines or spots in regular or random distribution.

A broad framework of the principles is presented herein by describing various aspects of the present teaching using exemplary embodiments that are represented in different drawing figures. For clarity and ease of description, each embodiment includes only a few aspects. However, different aspects from different embodiments may be combined or practiced separately, in one or more embodiments. Many different combinations and sub-combinations of the representative embodiments within the broad framework of this invention, that may be apparent to those skilled in the art but not explicitly shown or described, should not be construed as precluded.

Persons skilled in the art will appreciate that a variety of surface-emitting device configurations can be utilized in the present teaching. This includes regular surface-emitting arrays configured as commonly activated arrays and regular surface-emitting arrays configured as individual or group-addressable surface-emitting arrays. This also includes top-emitting surface-emitting arrays and bottom-emitting surface-emitting arrays. This also includes extended-cavity three-mirror VCSEL arrays and external-cavity three-mirror VCSEL arrays. The surface-emitting devices may comprise a single element, or the surface-emitting devices may comprise arrays of multiple elements. The arrays of elements may extend in one- or two-dimensions.

FIG. 1A and FIG. 1B illustrate the material structure of an element of typical VCSEL single-element and VCSEL array-element devices used to generate the coded patterns of the present teaching. FIG. 1A illustrates the material structure of a top-emitting VCSEL device 100. The simple two-terminal top-emitting VCSEL device 100 is constructed on a substrate 102 and includes a top electrical contact layer 108 on the same side as an emitting surface 110. A light emitting and gain region 104, which includes one or more quantum wells, is disposed between two dielectric reflectors 106 and 103. A bottom electrical contact layer 107 is formed on a surface opposite to that of the top contact 108. A current confinement aperture 105 controls the flow of drive current to the light emitting and gain region 104 and determines the shape of emission beam. This feature using an aperture to obtain a desired beam shape has been described in U.S. Patent Publication Number 2013-0163627, which has been incorporated by reference and which is owned by the assignee of the present application.

Light emission 109 emerges from the emitting surface 110 of the top-emitting VCSEL device 100. The emitting surface 110 is positioned on the opposite the end of the device from where the substrate 102 is positioned. The top contact 108 is positioned adjacent to the mirror 106, and the bottom contact layer 107 is positioned adjacent to the substrate 102. The top-emitting VCSEL device 100 is mounted with the substrate side down, such that the light emerges from an upper surface of the mounted device. In addition, in some embodiments, the thickness of the substrate 102 is reduced, or the substrate 102 is completely removed as is common practice to realize efficient heat dissipation.

FIG. 1B illustrates a material structure of a bottom-emitting VCSEL device 100'. The simple two-terminal bottom-emitting VCSEL device 100' is constructed on a substrate 102' and includes a top electrical contact layer 108' positioned adjacent to the substrate 102'. The top electrical contact layer 108' is also on the same side as an emitting surface 110'. Light emission 109' emerges from the emitting surface 110'. A light emitting and gain region 104' including one or more quantum wells, is disposed between two dielectric reflectors 106' and 103'. A bottom electrical contact layer 107' is formed on a surface opposite to that of the top contact 108'. A current confinement aperture 105' controls the flow of drive current to the light emitting and gain region 104' and determines the shape of emission beam.

It should be noted that the bottom-emitting VCSEL device 100' shown in FIG. 1B is mounted with the substrate side up such that the light emerges from an upper surface of the mounted device. In addition, in some embodiments, the thickness of the substrate 102' is reduced, or the substrate 102' is completely removed as is common practice to realize efficient heat dissipation.

It can be appreciated by those skilled in the art that instead of a single VCSEL device, an array of multiple VCSEL devices may be constructed on a single substrate. FIG. 1C illustrates a top view of a two-dimensional VCSEL device configured as a monolithic array. More specifically, a two-dimensional array 113 of a plurality of VCSEL devices is constructed on a common substrate 114. Each dot in FIG. 1C represents a VCSEL device that is similar to those illustrated in FIG. 1A and FIG. 1B. All the VCSELs in the two-dimensional array 113 are electrically connected to the substrate 114 which functions as a common terminal of the array. In embodiments in which the VCSELs emit collectively, the other electrical contact of each VCSEL in the array is connected using a common metallization on the array surface which functions as a second common terminal of the array. Alternately in embodiments that utilize separate activation of the VCSELs, separate electrical connections are made to the contacts on the active-layer side of the VCSEL array. These electrical connections represent an electrical input used to apply an electrical drive signal. When individual VCSELs share a common metallization contact, these VCSELS will be driven by common electrical drive signal applied to that electrical input. For embodiments of two-dimensional VCSEL device arrays using top-emitting VCSEL devices (FIG. 1A), the separate electrical connections are made to the top contact layer 108. For embodiments of two-dimensional VCSEL device array using bottom-emitting VCSEL devices (FIG. 1B), the separate electrical connections are made to the bottom contact layer 107'.

The array of VCSEL devices emit collectively in an upward direction. The VCSEL array as shown in FIG. 1C may be referred to as a VCSEL array chip. In this particular example, the VCSEL devices are arranged to form a circular VCSEL array chip. It can be appreciated that VCSEL array chips may be configured in any regular geometric pattern or non-regular random pattern. In some embodiments, the VCSEL array chip may be mounted on any kind of a thermal sub-mount that are described in, for example, U.S. Patent Publication No. 2013-0163627, which has been incorporated by reference and which is owned by the assignee of the present application.

In some coded-pattern 3D imaging and gesture recognition applications, linearly polarized structured illumination is required. In these situations, the polarization orientation of a VCSEL array element or the entire VCSEL array is orientated by introducing some form of birefringence into the resonant cavity. Referring to FIGS. 1A and 1B, in some embodiments birefringence is achieved by forming a non-symmetrical shape of the aperture 105, 105'. Alternatively, or in addition, in some embodiments refractive index birefringence is introduced. Alternatively, or in addition, in some embodiments some form of linear grating is written on the VCSEL emitting surface 110, 110'. It will be apparent to those skilled art how different orientations of linear polarization can be obtained in different regions of the array using various of these methods. Using these techniques, it is possible to generate coded structured light patterns with different polarization in different areas of the structured light pattern. Furthermore, different patterns can be obtained by passing the optical patterns through various polarization-dependent elements, such as polarizers and waveplates.

In embodiments with the two-terminal VCSEL devices shown in FIGS. 1A and 1B, the two terminals of the VCSEL array chip are located on two opposite ends of the VCSEL array chip. For some applications it is more convenient to arrange for the two terminals to be placed on the same side of the chip. Thus, some embodiments of the present teaching utilize two-terminal VCSEL devices with the two terminals on the same side of the chip. These embodiments are especially applicable for high volume assembly where surface mount technology or flip-chip technology can be used to mount the VCSEL on a sub-mount or printed circuit board. U.S. Pat. Nos. 8,675,706 and 8,783,893 describe methods for designing and building such surface mount VCSEL arrays. These patents are incorporated herein by reference and are assigned to the assignee of the present application.

The gain and power capacity of the VCSEL device can be increased by providing multiple groups of quantum wells. Each group of quantum wells has an aperture associated with it to confine the current and the optical mode in the same region to obtain high gain and power transfer into the optical mode. An important element is needed in between each group of quantum wells which transmits the charge carriers. This comprises a tunnel diode which allows carriers to tunnel through the p-n junction. The technology for arrays of high brightness VCSELs is described in U.S. Provisional Patent Application Ser. No. 61/985,776 filed Apr. 29, 2014 to Seurin et al. on Mar. 18, 2014. This patent application is incorporated herein by reference and is assigned to the assignee of the present application.

The use of more quantum well groups increases the power in the VCSEL in both single-mode and multi-mode configurations. However to restrict the operation to single-mode the aperture(s) have to be small diameter so that the higher order modes are attenuated. In order to further increase the power in single-mode operation and increase the brightness, the laser cavity parameters have to be changed to increase the single-mode diameter to draw power from a larger volume of the multiple groups of quantum wells. One of the cavity parameters to achieve this is the cavity length. Increasing the cavity length increases the diameter of the lasing modes and results in a larger aperture that can be used to control single-mode operation thus, increasing the gain volume to obtain higher power and brightness.

The VCSEL laser cavity length is increased by introducing a third mirror which can be placed a significant distance away from the VCSEL epitaxial two-mirror structure. The combination of the intermediate DBR mirror and the third mirror forms an equivalent mirror for the laser cavity and increases the cavity length to the distance between the third mirror and the other VCSEL DBR mirror. Several embodiments of the three-mirror cavity can be formed which either use a separate mirror, a mirror which is bonded directly to the VCSEL substrate or bonded by depositing a mirror coating on the VCSEL substrate surface opposite the VCSEL epitaxial structure.

The combination of the multiple groups of quantum wells in the gain region and the use of the three-mirror resonant cavity structure increases the single-mode power and thus the brightness of VCSEL devices by more than two orders of magnitude. The use of a third mirror to increase the brightness of a VCSEL element is equally applicable to VCSEL arrays and a single mirror can be used as the third mirror for the whole array. The technology for three-mirror cavity extended and external VCSEL arrays is described in U.S. Pat. Nos. 8,824,519 and 8,929,407. These patents are incorporated herein by reference and are assigned to the assignee of the present application.

FIG. 2A and FIG. 2B illustrate the material structure of elements of typical RC-LED single-element and RC-LED array-element devices used to generate the coded patterns of the present teaching. FIG. 2A illustrates a top-emitting RC-LED 215 of the present teaching. The top-emitting RC-LED 215 is constructed on a substrate 202. A top electrical contact layer 208 is positioned on the same side as an emitting surface 240. A light emitting and gain region 204 including one or more quantum wells, is disposed between two dielectric reflectors 217 and 203. Reflector 217 is a partially reflecting mirror that transmits a portion of the resonant spontaneous emission beam. A bottom electrical contact layer 207 is formed on a surface opposite to that of the top contact 208. A current confinement aperture 205 controls the flow of drive current to the light emitting region and also determines the shape of emission beam. Light emission 209 occurs from an emitting region 240 located opposite to end of the device where the substrate 202 is positioned. The top contact 208 and bottom contact 207 are proximate to the active layer end and the substrate end, respectively. The top-emitting RC-LED 215 is mounted with the substrate side down, such that the light emerges from an upper surface of the device. In addition, in some embodiments, the thickness of the substrate 202 is reduced, or the substrate 202 is completely removed as is common practice to realize efficient heat dissipation.

FIG. 2B illustrates a bottom-emitting RC-LED device 215'. The simple two-terminal bottom-emitting RC-LED device 215' is constructed on a substrate 202' and includes a top electrical contact layer 208' positioned adjacent to the substrate 202'. The top electrical contact layer 208' is also on the same side as the emitting surface 240'. Light emission 209' emerges from the emitting surface 240'. A light emitting and gain region 204' including one or more quantum wells, is disposed between two dielectric reflectors 203' and 217'. A bottom electrical contact layer 207' is formed on a surface opposite to that of the top contact 208'. A current confinement aperture 205' controls the flow of drive current to the light emitting and gain region 204' and determines the shape of emission beam. The top electrical contact layer 208' and is proximate to the substrate 202' and the bottom electrical contact layer 207' is proximate to the active layer. The bottom-emitting RC-LED device 215' is mounted with the substrate side up such that the light emission in the device is in an upward direction shown by the arrow 209'. While the devices are shown with their respective substrates, it is a common practice to reduce the thickness of the substrate 202', or completely remove the substrate 202' for efficient heat dissipation.

It can be appreciated by those skilled in the art that instead of a single RC-LED device, an array of multiple RC-LED devices may be constructed on a single substrate. FIG. 2C illustrates a top view of a two-dimensional RC-LED device of the present teaching configured as a monolithic array. More specifically, a two-dimensional array 218 of a plurality of RC-LED devices is constructed on a common substrate 214. Each dot in FIG. 2C represents a RC-LED device that is similar to those illustrated in FIG. 2A or FIG. 2B. All the RC-LEDs in the two-dimensional array 218 are electrically connected to the substrate which functions as a first common terminal of the array. In embodiments in which the RC-LEDs emit collectively, the second electrical contact of each RC-LED in the array is connected using a common metallization on the array surface which functions as a second common terminal of the array. Alternately in embodiments that utilize separate activation of the RC-LEDs, separate electrical connections are made to the active layer side of the RC-LED array. For embodiments of two-dimensional RC-LED device array using top-emitting RC-LED devices (FIG. 2A), the separate electrical connections are made to the top contact layer 208. For embodiments of two-dimensional RC-LED device array using bottom-emitting RC-LED devices (FIG. 2B), the separate electrical connections are made to the bottom contact layer 207'.

The RC-LED devices emit collectively in an upward direction. The RC-LED array as shown in FIG. 2C will be referred as a RC-LED array chip. In this particular example, the RC-LED devices are arranged to form a circular RC-LED array chip. It can be appreciated that RC-LED array chips may be configured in any regular or non-regular geometric pattern or a random pattern.

FIG. 3 illustrates a prior art surface-emitting array with microlens. In some embodiments, the surface-emitting array is a VCSEL array. In some embodiments the surface-emitting array is a RC-LED array. A microlens array 321 is aligned a focal distance away from the surface-emitting array 300. The microlens array 321 collimates light from the surface-emitting array 300. Collimating the light from the surface-emitting array increases the effective brightness of the light emerging from the surface-emitting array. The microlens array 321 is dimensioned and laterally aligned so that each microlens element 320 is coaxially aligned to an emitting element optical axis 323. This results in a parallel array of collimated beams 322 from the surface-emitting array 300. In some embodiments, the microlens array 321 is a separate optical component aligned and fixtured in front of the surface-emitting array 300, as shown in FIG. 3.

In some embodiments, the microlens is integrated with the surface-emitting array element as shown in FIGS. 4A and 4B. FIG. 4A illustrates a structure of a top-emitting array element with integrated microlens. An epitaxial-grown layer structure 401 is grown on a substrate 402 and light emitting devices are fabricated in this structure. The top electrical contacts 408 and bottom electrical contacts 407 are connected to the surface emitter driver to activate the array. Top electrical contact 408 on the output surface has an aperture to allow propagation of the output beam 425. On top of the surface-emitting array on the output surface is deposited a transparent optical material 426 and this is shaped, typically by reactive-ion etch (ME) etching or other suitable fabrication processes, including molding, to form a convex lens 424. The shape of the convex lens 424 is designed to give the correct focal length so that it collimates the beam emitted by the emitting array element. In some embodiments, the microlens is fabricated directly on the surface-emitting array FIG. 4B illustrates a structure of a bottom-emitting array element with integrated microlens. The surface emitting structure 401' is grown on the substrate 402' and the structure is designed so that the output beam traverses through the substrate 402'. The electrical contacts 407' 408' are connected to the emitter array driver to activate the array. Contact 408 on the substrate surface has an aperture to allow propagation of the output beam 425'. The lens 427' is designed with a shape to give the correct focal length so that it collimates the beam emitted by the emitter array element. In the case of the bottom-emitting array where the output beam traverses the substrate, the lens can be made in the same way as the embodiment of FIG. 4A on the substrate surface or directly formed in the substrate of the array by etching of the substrate by wet etching or by ME. Details of the approach for achieving a VCSEL array with integrated microlens are described in U.S. Pat. No. 6,888,871 B1 to Kaiyan Zhang et al. This patent is incorporated herein by reference and has been assigned to the assignee of the present application.

FIG. 4C illustrates a surface-emitting array with the integrated microlens array monolithically integrated onto a common substrate. The array elements with microlenses 413 are fabricated on a common substrate 414. The output side a microlens array 428 is fabricated with the microlenses aligned to the emitting array elements. In some embodiments, a collimated array of output beams 419 is emitted from the microlens array 428. In some embodiments, the microlens array pitch is the same as the VCSEL array pitch and the VCSEL array is aligned and registered to the microlens array to collimate the VCSEL element output beams. In some embodiments, the microlens array pitch is smaller than the VCSEL array pitch and the microlens array is aligned and registered to the VCSEL array to collimate and converge the VCSEL element output beam directions. In some embodiments, the microlens array pitch is larger than the VCSEL array pitch and is aligned and registered to the VCSEL array to collimate and diverge the VCSEL element output beam directions.

Figure 5:
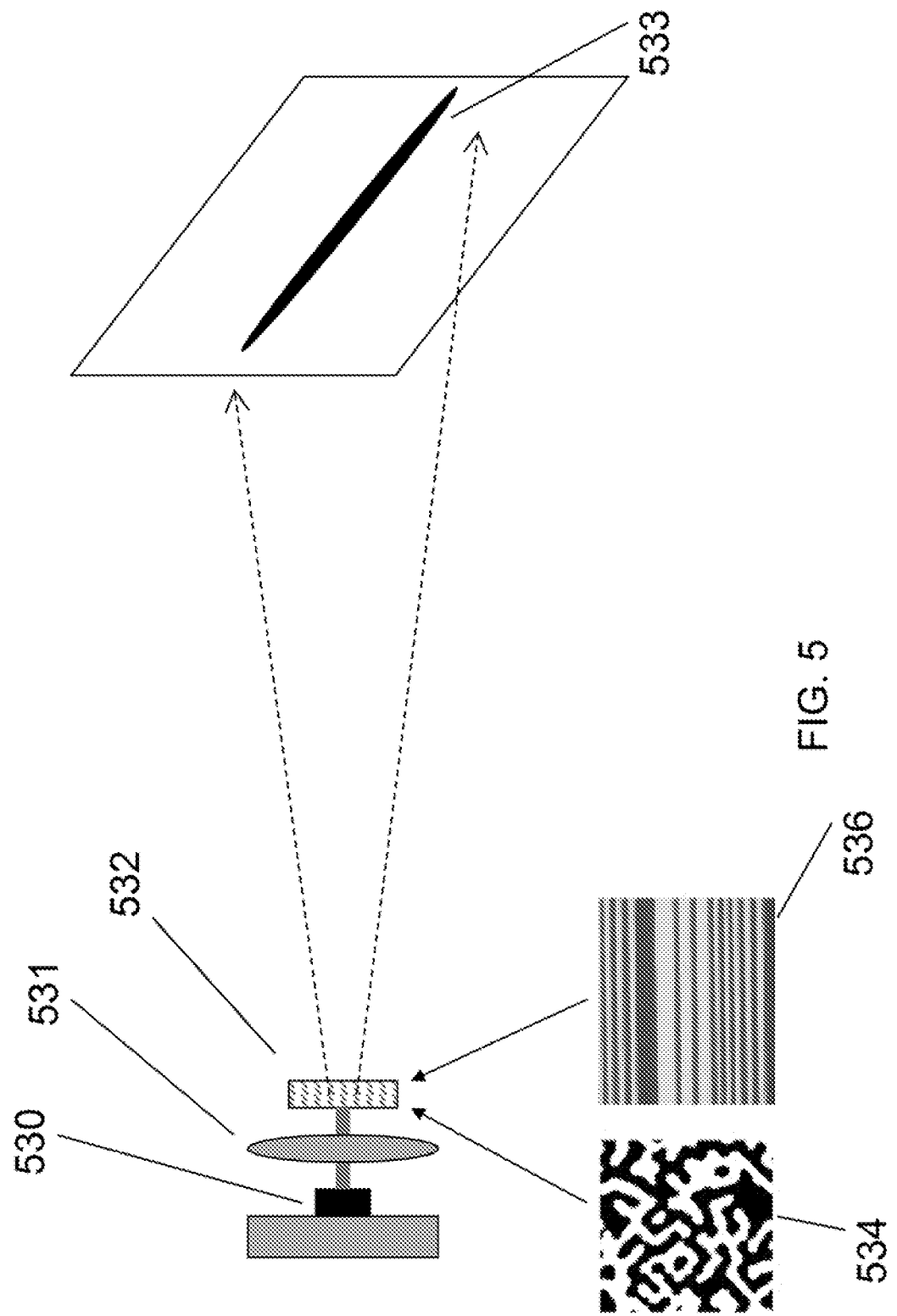
FIG. 5 illustrates an embodiment of a coded pattern projector apparatus of the present teaching that generates a stripe or fringe pattern and projects it into a region.

FIG. 5 illustrates a coded pattern projector apparatus of the present teaching that generates a stripe or fringe pattern and projects it into a region. FIG. 5 illustrates an embodiment that uses a single emitter element 530. A single VCSEL element 530 emits a round beam which is collimated by the lens 531 and directed to a DOE 532. The DOE 532 diverges the beam shape in one dimension, but maintains a collimated beam in the other dimension forming a stripe image 533. In some embodiments, the image, or spatial pattern, is a thin wide stripe. In some embodiments the image, or spatial pattern, is a fringe pattern. Insets 534, 536 illustrate examples of typical DOE structures used realize the desired projected beam pattern.

Figure 6:
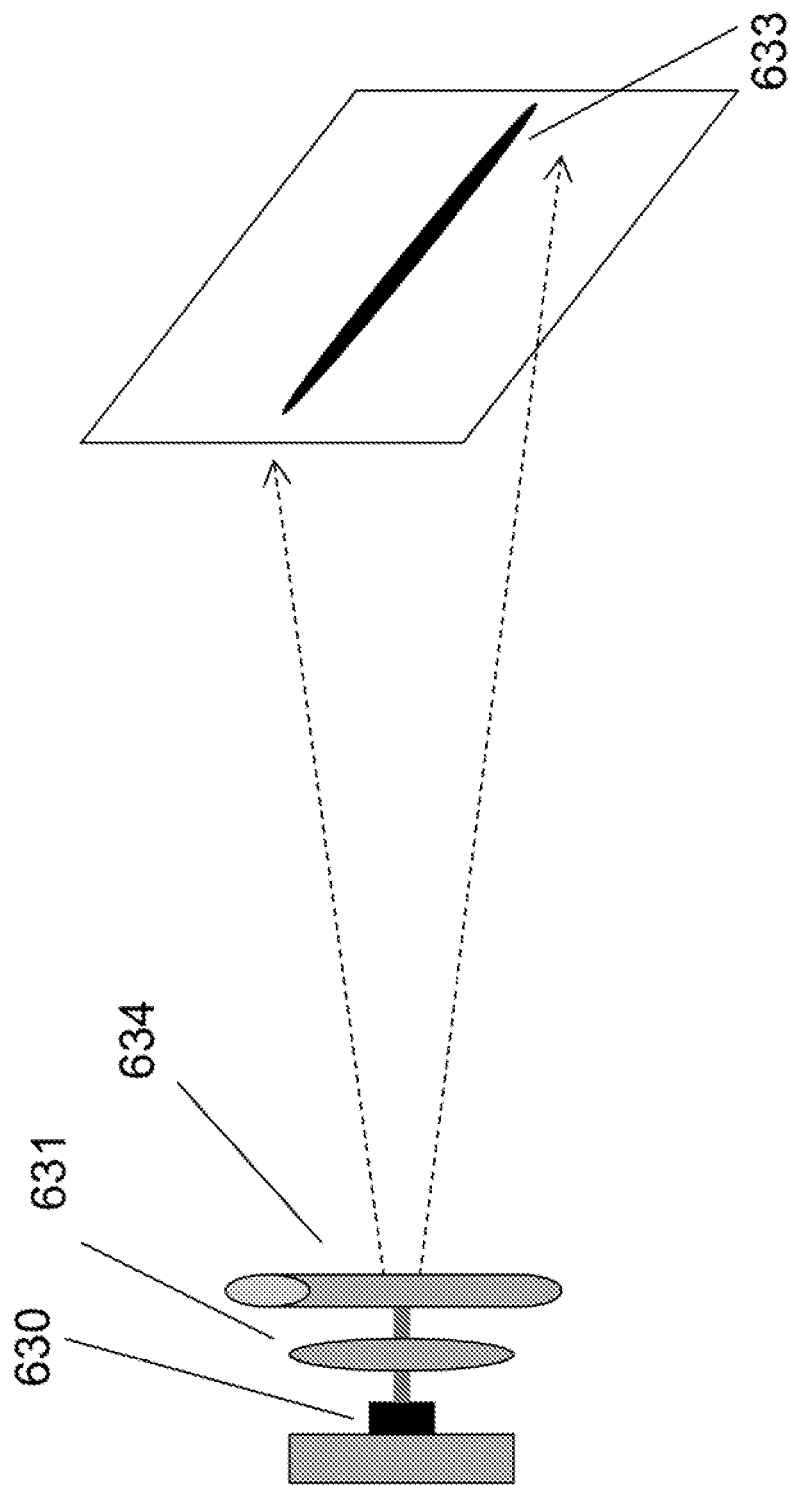
FIG. 6 illustrates an embodiment of a coded pattern projector apparatus of the present teaching that generates a stripe pattern and projects it into a region.

FIG. 6 illustrates an embodiment of a coded pattern projector apparatus of the present teaching that generates a stripe pattern and projects it into a region. A single surface-emitting element 630 emits a beam which is collimated by the lens 631. A cylindrical lens 634 is used to diverge the beam shape in one dimension but maintain a collimated beam in the other dimension forming a stripe image 633. The cylindrical lens 634 can be either convex or concave. In the case of the convex lens, the distance from the lens to the location of the structured pattern 633 is much larger than the lens focal length. In some embodiments, the cylindrical lens is a diverging lens. In some embodiments, the cylindrical lens is a short-focal-length converging lens. The decision whether to use a DOE or cylindrical lens will depend on the size and field of view of the projected pattern as well as the desired assembled apparatus size. Using a DOE provides more flexibility for design and can project a larger field of view. It should be noted that in the following discussion, although not specifically stated, a cylindrical lens can be substituted for a DOE for generating the stripe image.

The stripe image produced by the embodiments of the apparatus that generates a stripe or fringe pattern and projects it into a region of FIGS. 5 and 6 has a slight oval shape, which is a result of stretching the typically Gaussian profile beam from the VCSEL.

Figure 7:
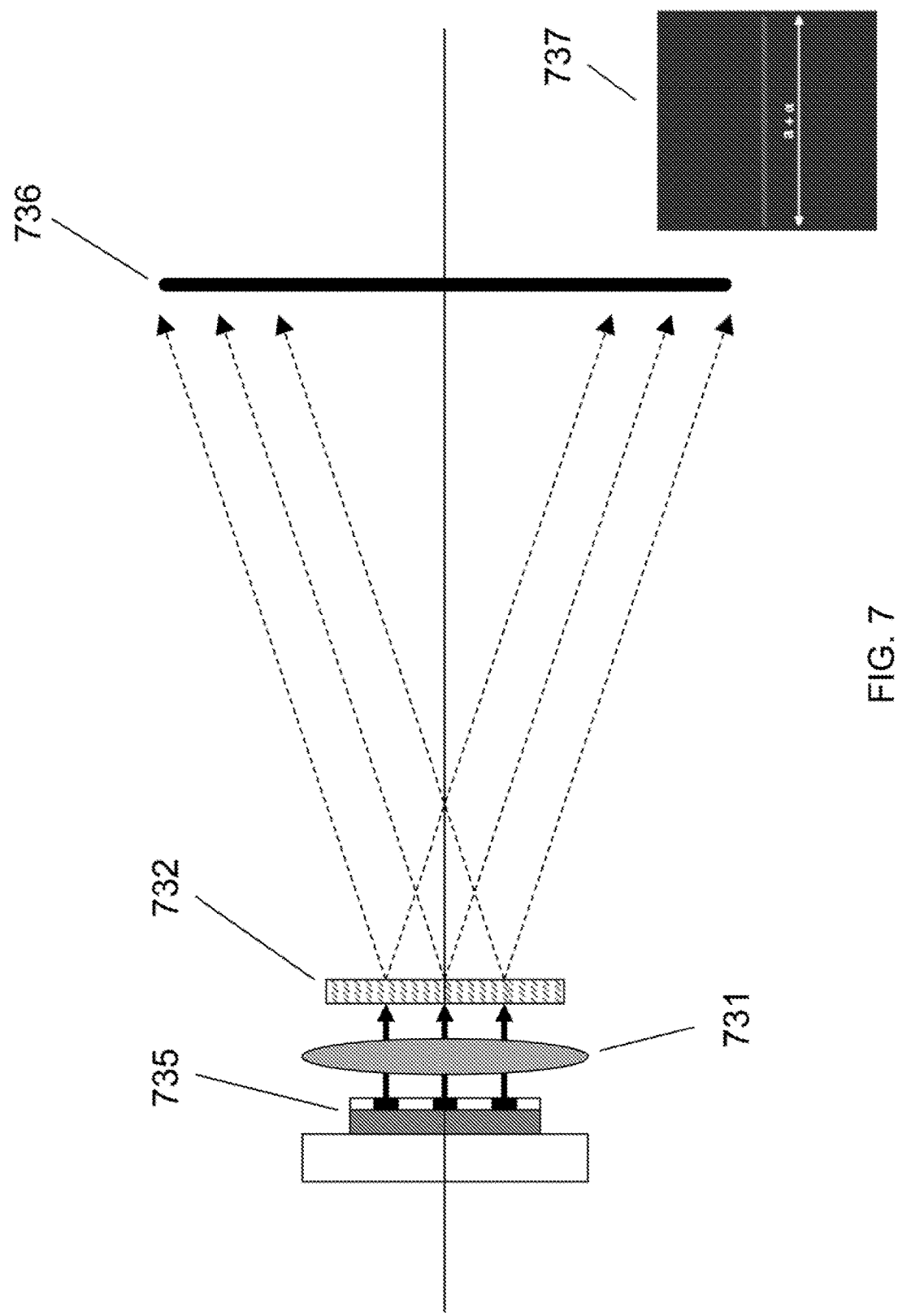
FIG. 7 illustrates an embodiment of a coded pattern projector apparatus of the present teaching that generates a uniform stripe or fringe pattern and projects it into a region.

FIG. 7 illustrates an embodiment of a coded pattern projector apparatus of the present teaching that generates a uniform stripe or fringe pattern and projects it into a region. A more uniform stripe is generated by using multiple VCSELs configured in a linear array. A VCSEL array 735 emits multiple parallel beams that are collimated by a lens 731 and directed to a DOE 732. In some embodiments, three or more VCSEL emitters in a row are used to generate a uniform stripe. The DOE generates multiple stripes that are superimposed to form a single more uniform stripe 736. A picture 737 of an actual stripe produced in this manner is shown in FIG. 7. The stripe exhibits a uniform stripe pattern.

Some embodiments of the method and system of the present teaching describe the use of VCSEL arrays to generate arrays of optical beams. One skilled in the art will appreciate that other surface-emitting array technology can be used in place of VCSEL arrays. For example, RC-LED arrays may be used as surface-emitting arrays in some embodiments. In various embodiments, various known surface-emitting array technologies may be utilized.

Because the pattern of light projected into the region depends on the pattern of illumination generated by the surface-emitting array, different patterns can be projected into a region by selectively activating different groups of emitters of a surface-emitting array. Individual or groups of emitter elements may be connected to particular contacts that are activated by a surface emitter driver. A controller connected to the surface emitter driver can then selectively activate the individual and/or groups of pixels in particular sequences. These sequences of spatial patterns produced by the controller are referred to as coded patterns.

Figure 8B:
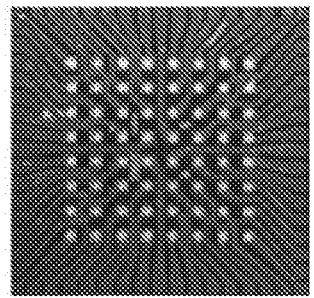
FIG. 8B illustrates a photograph of an embodiment of a VCSEL array of the present teaching mounted in a quad flat pack housing and connected to the housing leads.
Figure 8C:
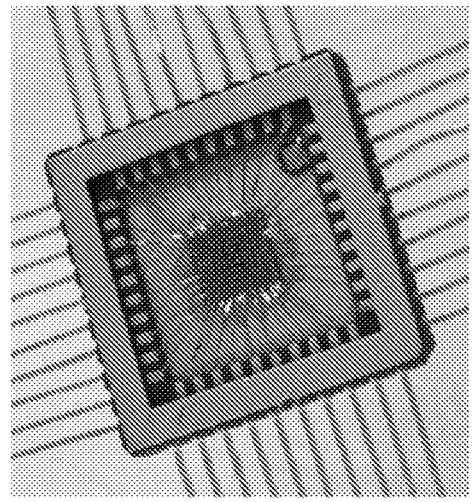
FIG. 8C illustrates a picture of an embodiment of an output beam spot pattern of a VCSEL array of the present teaching.
Figure 8A:
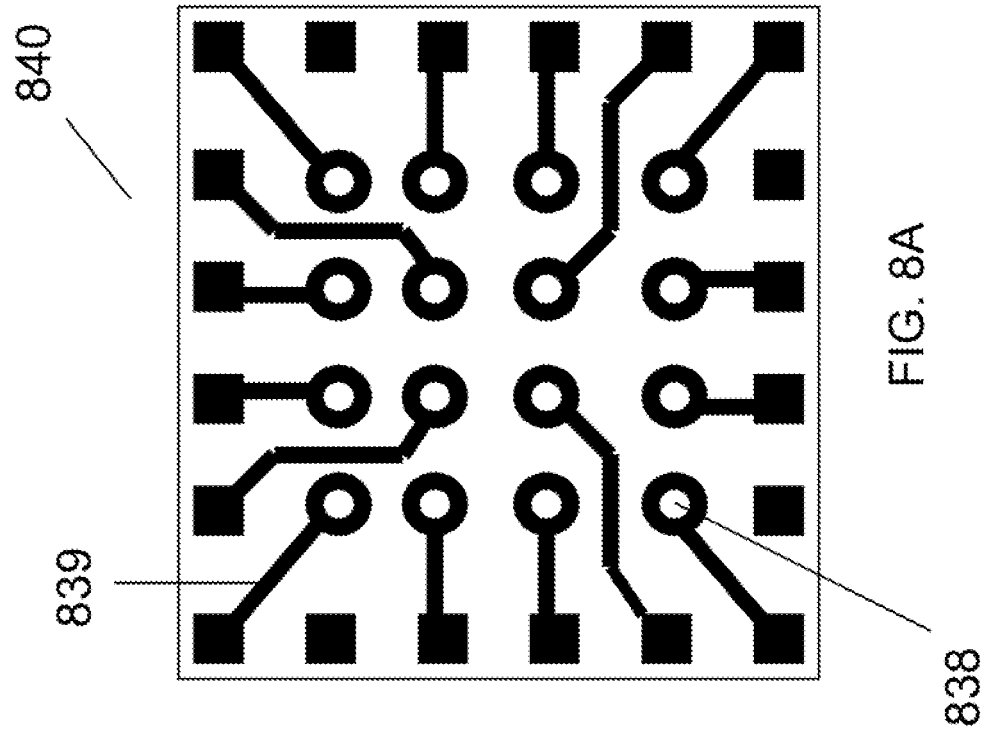
FIG. 8A illustrates an embodiment of a 4×4 two-dimensional VCSEL array of the present teaching.

Some applications of three-dimensional imaging or gesture recognition require an array of multiple stripes so that depth information can be acquired for several objects in the region of interest. An array of multiple stripes is obtained by using a two-dimensional surface-emitting array with the DOE such that the linear rows of VCSEL elements in one dimension generate the stripe and then the array of linear rows in the second dimension creates the multiple stripes. Generating a stripe with a linear row of VCSEL elements was described in connection with FIG. 7. FIGS. 8A-C illustrates various embodiments of two-dimensional VCSEL arrays of the present teaching. FIG. 8A illustrates an embodiment of a 4×4 two-dimensional VCSEL array 840 of the present teaching. The 4×4 VCSEL array 840 is configured with each element individually connected so each element can be activated separately. The top metallization mask for the VCSEL array has apertures 838 of the VCSEL elements and the electrical contact leads 839. In this addressable VCSEL array 840 each VCSEL element has its own separate contact lead and pad so that the VCSELs can be individually activated by an electrical drive signal.

FIG. 8B illustrates a photograph of an embodiment of a VCSEL array of the present teaching mounted in a quad flat pack housing and connected to the housing leads. FIG. 8C illustrates a picture of an embodiment of an output beam spot pattern of a VCSEL array of the present teaching. In this embodiment, the VCSEL array output beam spot pattern is shown with all the VCSEL elements activated.

FIG. 9A illustrates an embodiment of a coded pattern projector apparatus of the present teaching that generates an array of multiple stripes and projects it into a region. In the illustrated example, a controller 902 has a plurality of electrical outputs 904, each of which is connected to a respective electrical input 906 of each emitter in a two-dimensional VCSEL array 940. The output beams from the two-dimensional VCSEL array 940 are projected by a lens 931 through a DOE 932. Light from adjacent elements in a row of the VCSEL array 940 coalesces to form a uniform stripe of light. The DOE 932 projects an array of stripes 941 into the region. Each stripe can be separately activated by activating a corresponding row of VCSEL elements in the array. Thus, different patterns of stripes can be generated by activating the relevant rows in the VCSEL array. FIG. 9B illustrates a photograph 942 of the array of stripes generated by the arrangement illustrated in FIG. 9A in a bench top experiment. The photo 942 shows a fully-activated stripe pattern. For 3D imaging or gesture recognition applications, a sequence of different spatially-coded patterns can be projected by activating different sets of VCSEL array rows as a function of time. A camera or other 2D sensor is located off-axis and used to record images of objects illuminated by the sequence of projected patterns. Analysis of the resulting distorted stripe images will provide three-dimensional depth information about the objects. Analysis of the resulting distorted stripe images may also provide three-dimensional depth information about the objects as a function of time.

Surface-emitting elements generate light beams with a space between them that is typically two or three beam diameters in size. The space is required for peripheral parts of the emitter design such as contact ring, mesa surround, and other features that cannot be eliminated. As a consequence, the stripes shown in FIGS. 9A-B have corresponding space between them. An optimum projected stripe pattern for high-resolution 3D imaging and gesture recognition would not have these gaps but contain stripes that partially overlap so that adjacent stripes would coalesce into a thicker stripe. In this way, the whole scene would be covered by the stripe pattern and small objects or parts of objects located in the gaps would not be missed in the imaging and analysis.

Figure 10:
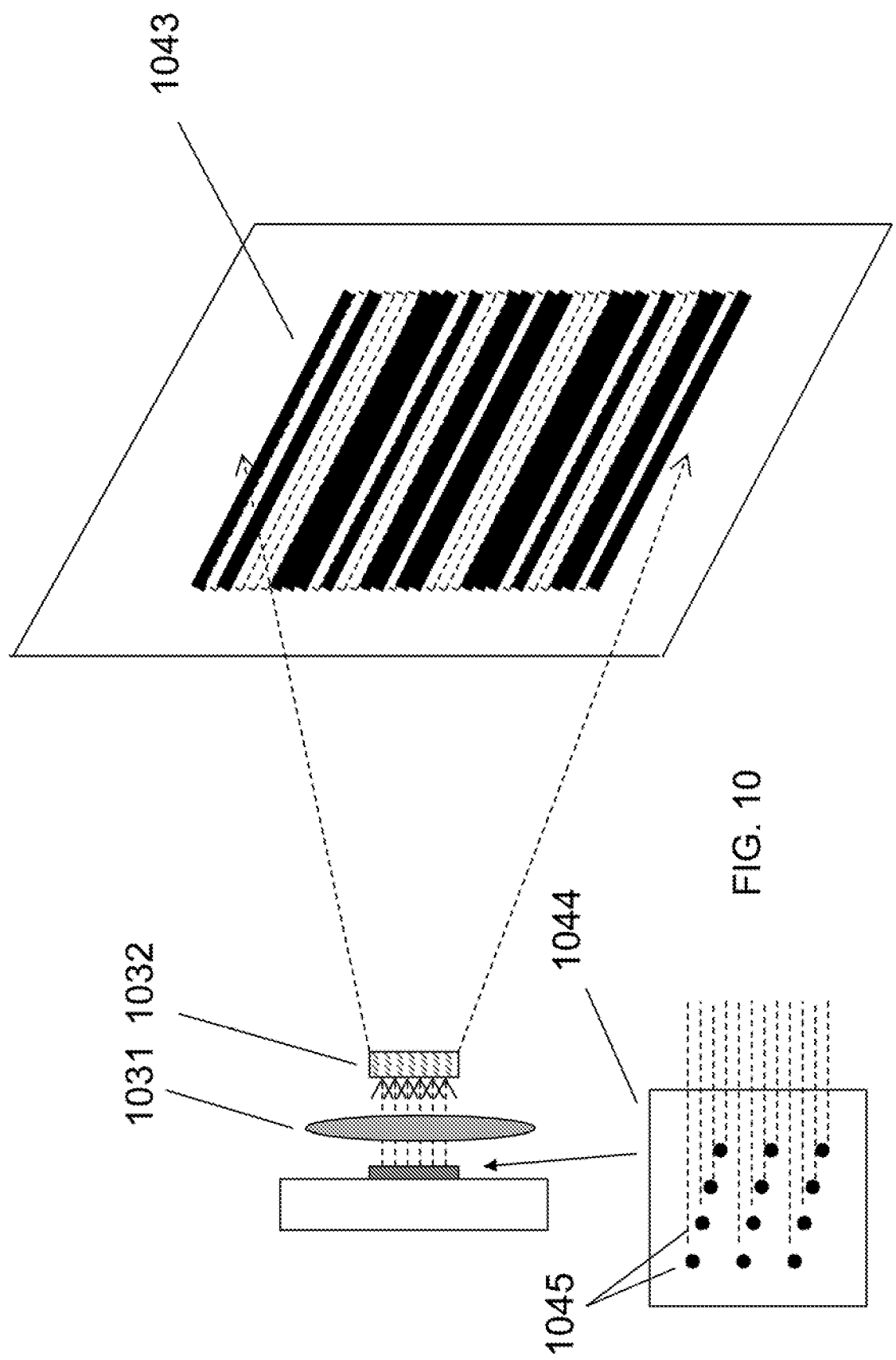
FIG. 10 illustrates an embodiment of a coded pattern projector apparatus of the present teaching that generates an array of coalesced multiple stripes and projects it into a region.

FIG. 10 illustrates an embodiment of a coded pattern projector apparatus of the present teaching that generates an array of coalesced multiple stripes and projects it into a region. To obtain a coalesced stripe pattern 1043, instead of a square array of surface-emitting elements, the inset 1044 illustrates a pattern of the surface-emitting array with vertical columns of elements 1045 positioned with a small offset in the horizontal direction. Note that reference to vertical and horizontal directions are provided for clarity of example. Persons skilled in the art will appreciate that the teaching is not limited to rows of elements being offset in a particular direction. The offset is designed such that adjacent VCSEL element spacing is reduced in the vertical direction. In some embodiments, the size of the offset of the element position is designed to be approximately equal to the beam size. When the output beams from the surface-emitting arrays with offset are projected through the DOE, they form stripes which are imaged side-by-side with no gap. Since the beam profile is typically Gaussian, in some embodiments, the offset is adjusted slightly less than the beam size to produce a small overlap to make the intensity of adjacent activated stripes more uniform. In a similar manner as described in in FIGS. 9A-B, each stripe can be separately activated by activating the corresponding VCSEL elements in the array. Thus, different patterns of stripes can be generated by activating the relevant elements in the VCSEL array. In this way a fully-filled binary coded pattern can be generated.

Figure 11:
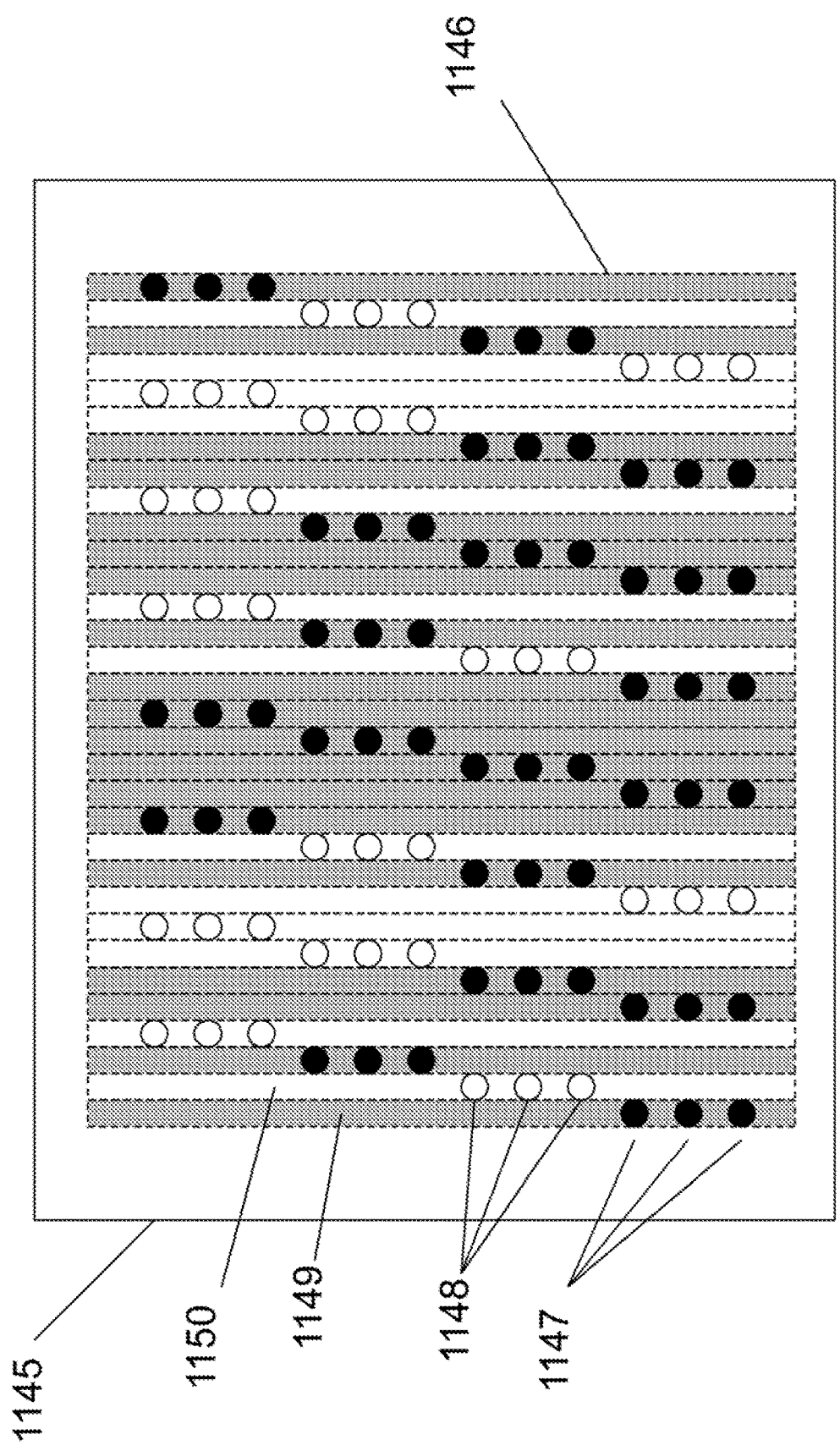
FIG. 11 illustrates an embodiment of a surface-emitting element layout of the present teaching for projecting multiple uniform stripes into a region.

In a similar manner as that described above in connection with FIG. 7, improved, more uniform stripes can be created by using multiple emitter elements for each stripe. FIG. 11 illustrates a surface-emitting element layout of the present teaching for projecting multiple uniform stripes into a region. The layout embodiment illustrated in FIG. 11 uses the same offset pattern of the embodiment of FIG. 10, but also includes multiple VCSEL elements that contribute to each stripe, which produces a more uniform stripe. The VCSEL array layout 1145 has sets of three in-line elements 1147, 1148. Each set of three in-line elements 1147, 1148 form a stripe. Each set of three in-line elements 1147, 1148 is offset from the adjacent set of elements by approximately the diameter of the beams. FIG. 11 also illustrates a corresponding projected stripe pattern 1146 superimposed on the VCSEL array 1145. The projected stripe pattern 1146 shown in the FIG. 11 is a reduced size to be able to illustrate the overlap with the VCSEL array 1145. The three in-line element set 1147 will generate the uniform projected stripe 1149. The adjacent three elements 1148, in this case not activated, will produce the unlit stripe 1150 adjacent to the lit stripe 1149. In the same way, as described in connection with FIG. 10, different patterns of stripes can be generated by activating the relevant sets of elements in the VCSEL array and a fully filled binary coded pattern can be produced. In various embodiments, various numbers of surface-emitting elements are included in the various sets. This includes sets comprising less than three elements and more than three elements. This also includes different sets comprising different numbers of elements.

Figure 12:
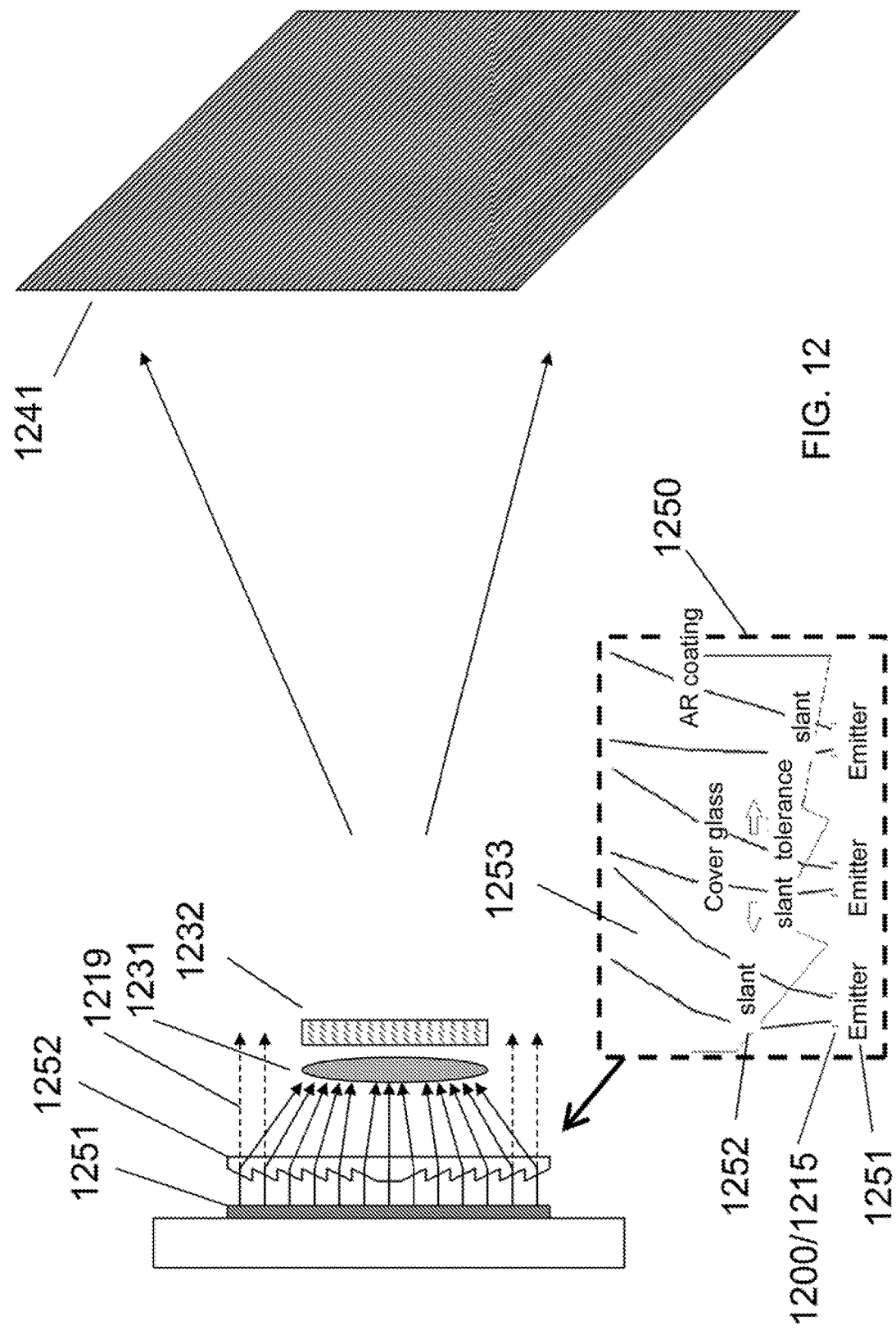
FIG. 12 illustrates an embodiment of the coded pattern projector apparatus of the present teaching including a micro-optic prism array.

One feature of the present teaching is that relatively large surface-emitting arrays can be used, and in particular, surface-emitting arrays that are larger than subsequent optical elements in the coded pattern projector apparatus. VCSEL arrays can be fabricated as large as 10 mm square or even larger. In many cases the VCSEL array will be larger than the projection lens and the DOE that are used to form the stripe pattern. As a consequence, the emitted beams near the periphery of the VCSEL array could miss the lens and DOE apertures, and thus not contribute to the brightness or shape of the projected pattern. This issue can be addressed using an optical element positioned between the VCSEL array and the DOE. FIG. 12 illustrates an embodiment of the coded pattern projector apparatus and method of the present teaching including a micro-optic prism array. A micro-optic prism array 1252 is placed in front of a VCSEL array 1251 to bend the output beams that would normally emit in directions shown by arrows 1219 towards the axis as shown by the solid arrows. In this way, the beams pass through the projection lens 1231 aperture. The inset 1250 shows detail of an embodiment of the form of the micro-optic prism array 1252 in which the surface angle for each micro-optic prism array 1252 element presented to each emitter 1200 of the VCSEL array 1251 is different. Specifically, the surface angle for each micro-optic prism element presented to each emitter 1200 increases proportionally for micro-prisms further from the center of the micro-optic prism array 1252 so that the beams 1253 close to the center are bent a small amount and the beams 1253 at the periphery are bent the most. In some embodiments, the surface angle is chosen so that there is an even distribution of beams through the lens 1231 aperture. Thus, the micro-optic prism array 1252 serves to bend the VCSEL output beams so they will propagate through the smaller aperture of the projection lens and or other optical elements in the coded pattern projector apparatus. The DOE 1232 generates a large stripe pattern 1241 from the large VCSEL array 1251 that is projected by the projection lens 1231.

The compact array of VCSEL beams emerges from the micro-optic prism array 1252 and propagates through a lens 1231 and then through a DOE 1232. The DOE 1232 diffracts the beams to form a stripe pattern 1241 in a region. The DOE 1232 has a structure that is designed to diffract the compact array of VCSEL beams and the specific propagation angles of the beams that is based on the emitter position and the surface angle for each micro-optic prism 1252 element presented to each emitter 1200.

Figure 13:
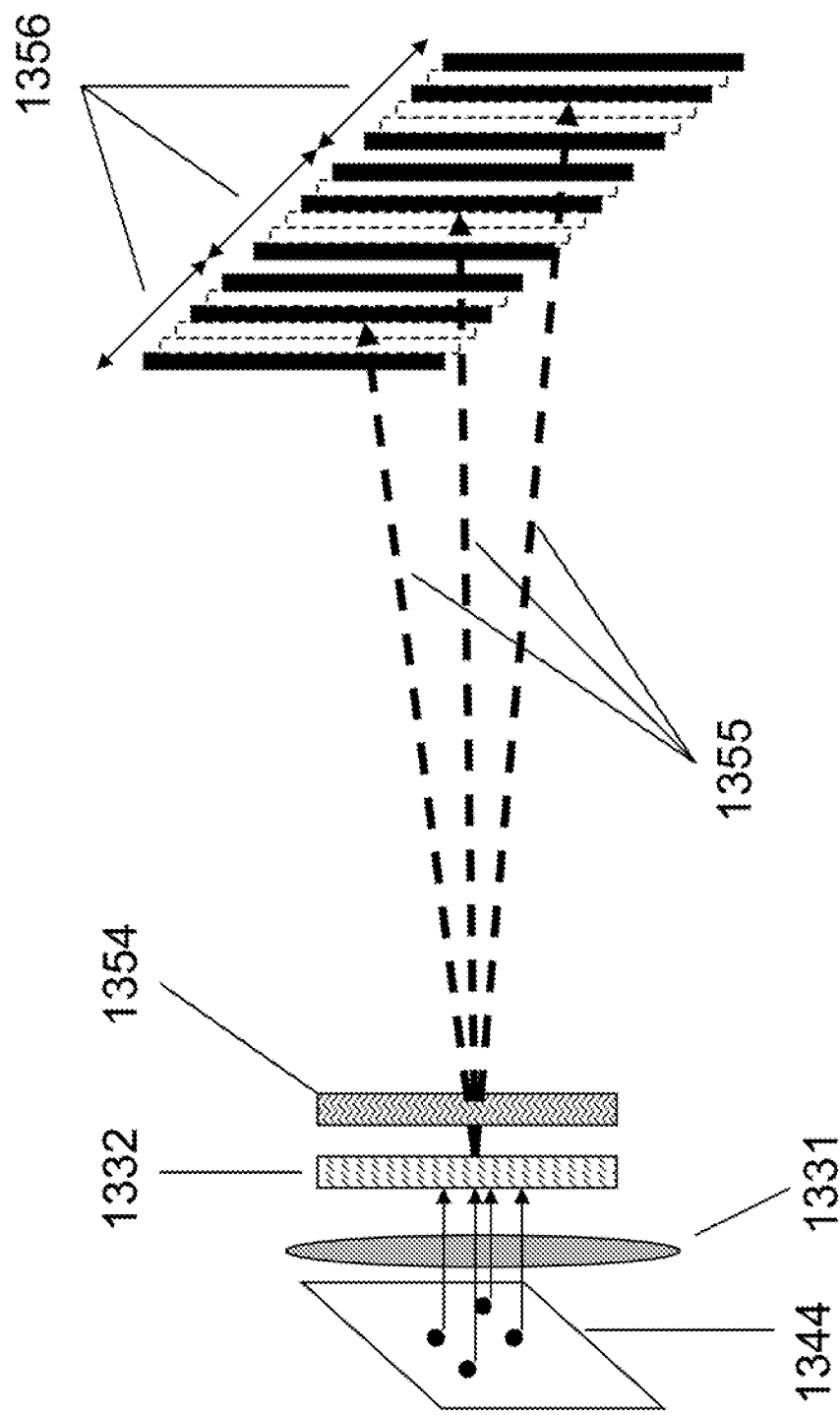
FIG. 13 illustrates an embodiment of a coded pattern projector apparatus of the present teaching comprising two DOEs.

In some embodiments, the number of stripes in the coded pattern is increased to expand the field of the projected pattern using a second DOE that may have a different structure than the first DOE. The structure of the second DOE is designed to multiply the whole stripe pattern and position replicas of them beside each other. FIG. 13 illustrates a coded pattern projector apparatus including two DOEs of the present teaching. A second DOE 1354 is placed after a first DOE 1332. The structure of the first DOE is designed to generate an original stripe pattern. The structure of the second DOE is designed to diffract the original stripe pattern at angles 1355 which place multiple replicas 1356 of the original stripe pattern adjacent to one another in the region. In this manner, multiple copies of the original stripe pattern are projected to form a large stripe pattern. In some embodiments, the large stripe pattern comprises multiple adjacent original stripe patterns, where the original stripe patterns result from the particular array pattern of the VCSEL array 1344 and the structure of the first DOE 1322. Thus, the second DOE creates multiple copies of the stripe array and aligns the edges of the outside stripes of adjacent copies to overlap so there are no gaps in the illumination for adjacent activated VCSEL elements.

Figure 14:
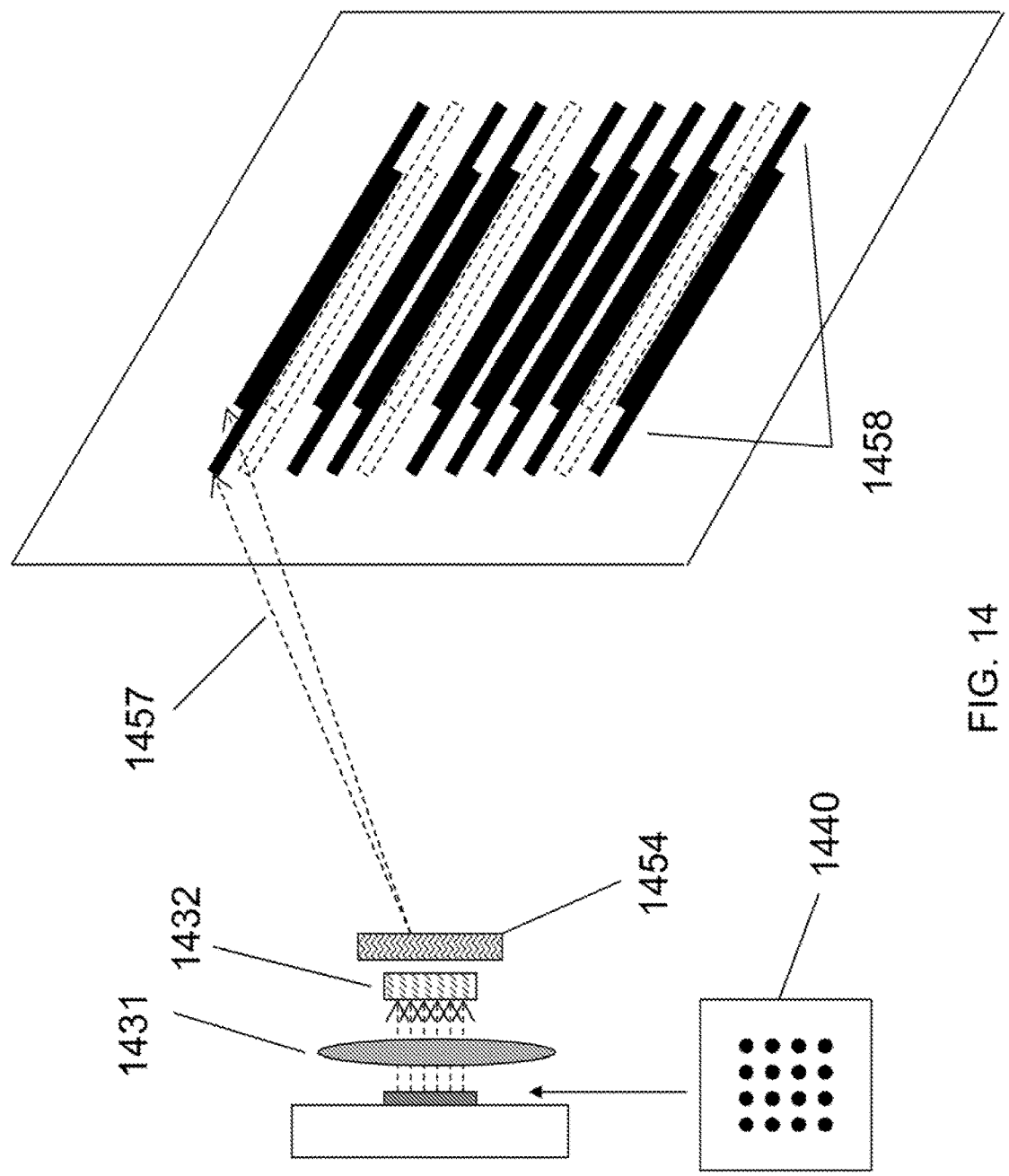
FIG. 14 illustrates an embodiment of a coded pattern projector apparatus of the present teaching comprising two DOEs.

In some embodiments, an additional DOE can also be used to produce fully filled stripe patterns. FIG. 14 illustrates a coded pattern projector apparatus of the present teaching including two DOEs. In the embodiment of FIG. 14, a regular array pattern of VCSEL elements shown in the inset 1440 is used. In this embodiment, there is no offset of the VCSEL elements. The light from emitters of the regular array patterned VCSEL array pass through a lens 1431 and a first DOE 1432 to generate an original stripe pattern. To place the stripes in the original stripe pattern adjacent to each other, a multiplier DOE 1454 is designed to replicate the original stripe patterns each with a small diffraction angle 1457. The diffraction angle 1457 is set to be approximately the same as the stripe width divergence angle of the original stripe pattern. This diffraction angle interleaves the original stripe patterns 1458, 1459 placing alternate stripes of original stripe patterns in the gaps of the neighboring stripe pattern.

FIG. 14 only shows diffraction creating two original stripe patterns 1458, 1459 for clarity in the drawing. In some embodiments, more interleaved original stripe patterns fully fill the gaps between the stripes. In some embodiments, three interleaved original stripe patterns generate a fully-filled strip pattern. In these embodiments, the three interleaved original stripe patterns fully fill the gaps by using an appropriate diffraction angle 1457. Generally, in the embodiment of FIG. 14, output light from a VCSEL array is propagated through a first DOE 1432 to form stripe arrays, and a second DOE 1454 interleaves the stripe array copies so that adjacent stripes from alternate copies overlap and there are no gaps in the illumination for adjacent activated VCSEL elements. FIG. 14 illustrates the original stripe patterns displaced horizontally for clarity of display. In some embodiments, the original stripe patterns are not displaced horizontally.

Figure 15:
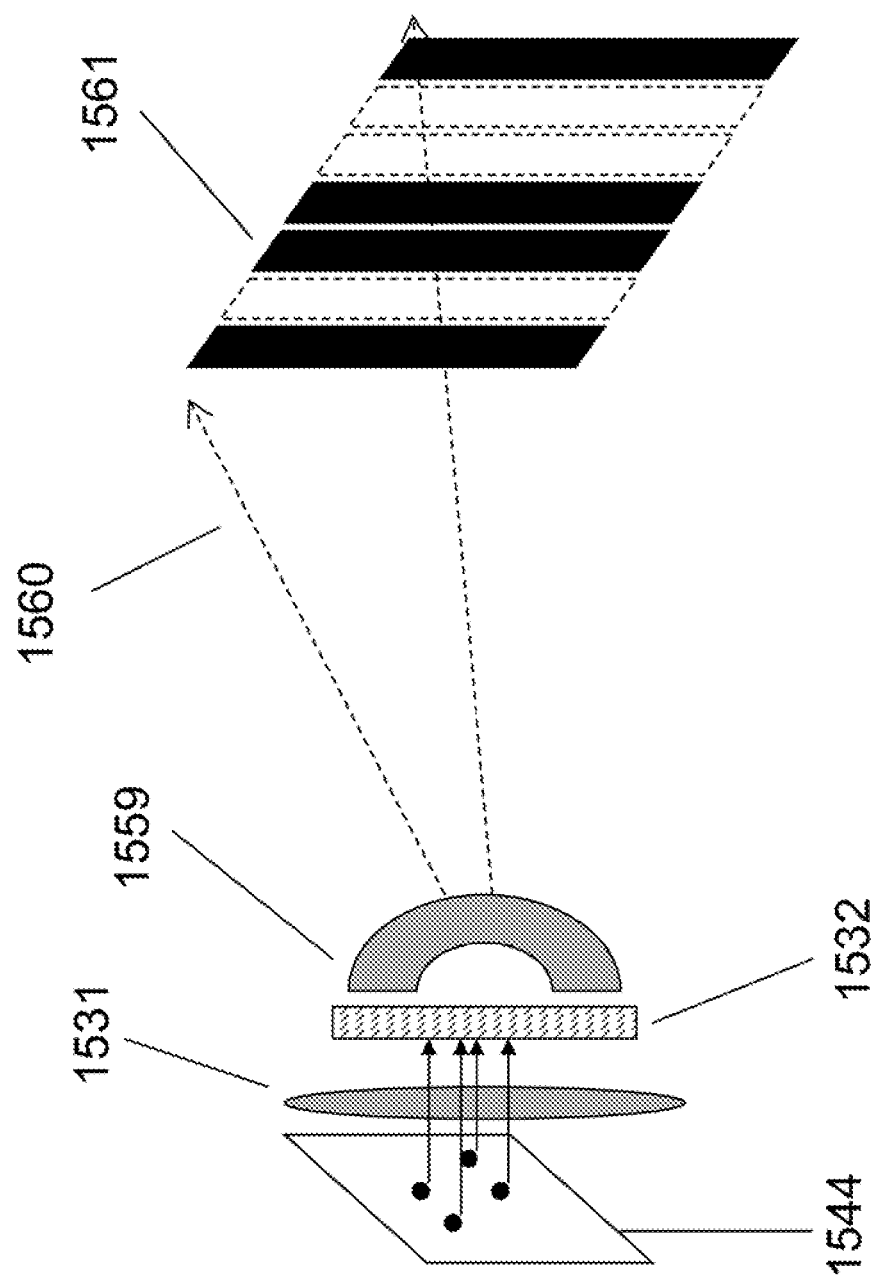
FIG. 15 illustrates an embodiment of the coded pattern projector of the present teaching comprising a fly's-eye diverging lens.

One feature of the present teaching is the use of additional optical elements in the beam path after the one or more DOEs of the coded pattern projector apparatus of the present teaching. Additional optical elements serve to adapt the projected pattern to different field conditions in the region. FIG. 15 illustrates an embodiment of the coded pattern projector of the present teaching that includes a fly's-eye diverging lens 1559. Light from elements of a VCSEL array 1544 are incident on a lens 1531 and then pass to a DOE 1532 to generate an original stripe pattern. In some embodiments, the DOE 1532 is one or more DOEs. In some embodiments, the one or more DOE is replaced by one or more cylindrical lens. The original stripe pattern is incident on the fly's-eye diverging lens 1559, which is used to expand the angular field 1560 of the stripe pattern 1561. Embodiments of the coded pattern projector of the present teaching that include a fly's-eye diverging lens are appropriate for close-up three-dimensional imaging applications. It will be apparent to those skilled in the art that other types of additional optical components, such as converging lenses, diverging lenses, and prisms could be used to match the coded structured pattern to the application field of view.

Figure 16:
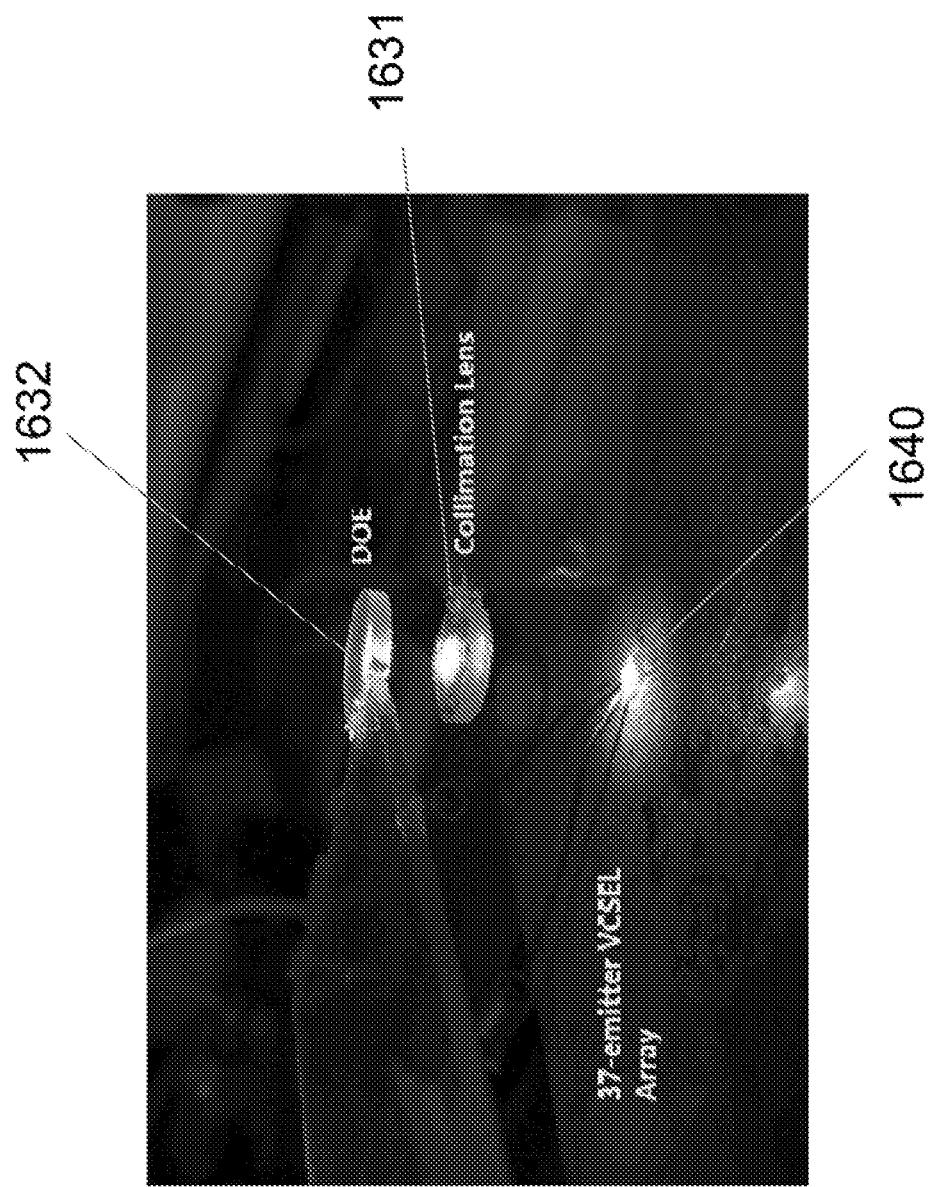
FIG. 16 is a photograph of an experimental bench top setup of an embodiment of the coded pattern projector apparatus of the present teaching.

FIG. 16 is a photograph of an experimental bench top setup of an embodiment of the coded pattern projector apparatus of the present teaching. FIG. 16 shows a thirty-seven-emitter VCSEL array 1640, a collimating/projection lens 1631 and DOE component 1632.

Figure 17:
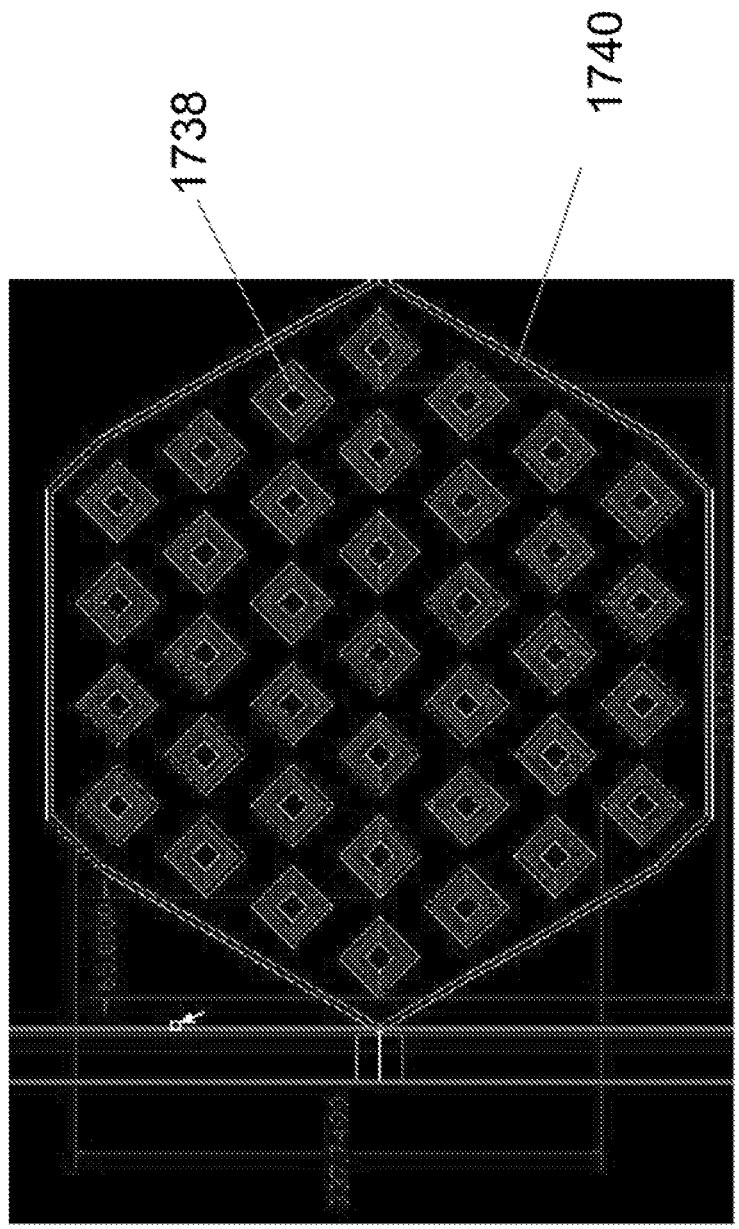
FIG. 17 illustrates a mask CAD drawing of an embodiment of a VCSEL array of the coded pattern projector apparatus of the present teaching.

FIG. 17 illustrates a mask CAD drawing of an embodiment of a VCSEL array of the coded pattern projector apparatus of the present teaching. The mask CAD drawing indicates a thirty-seven-emitter VCSEL array 1740 showing the layout of the individual VCSEL elements 1738. There are thirty-seven VCSEL elements 1738 arranged in a hexagonal array.

Figure 18:
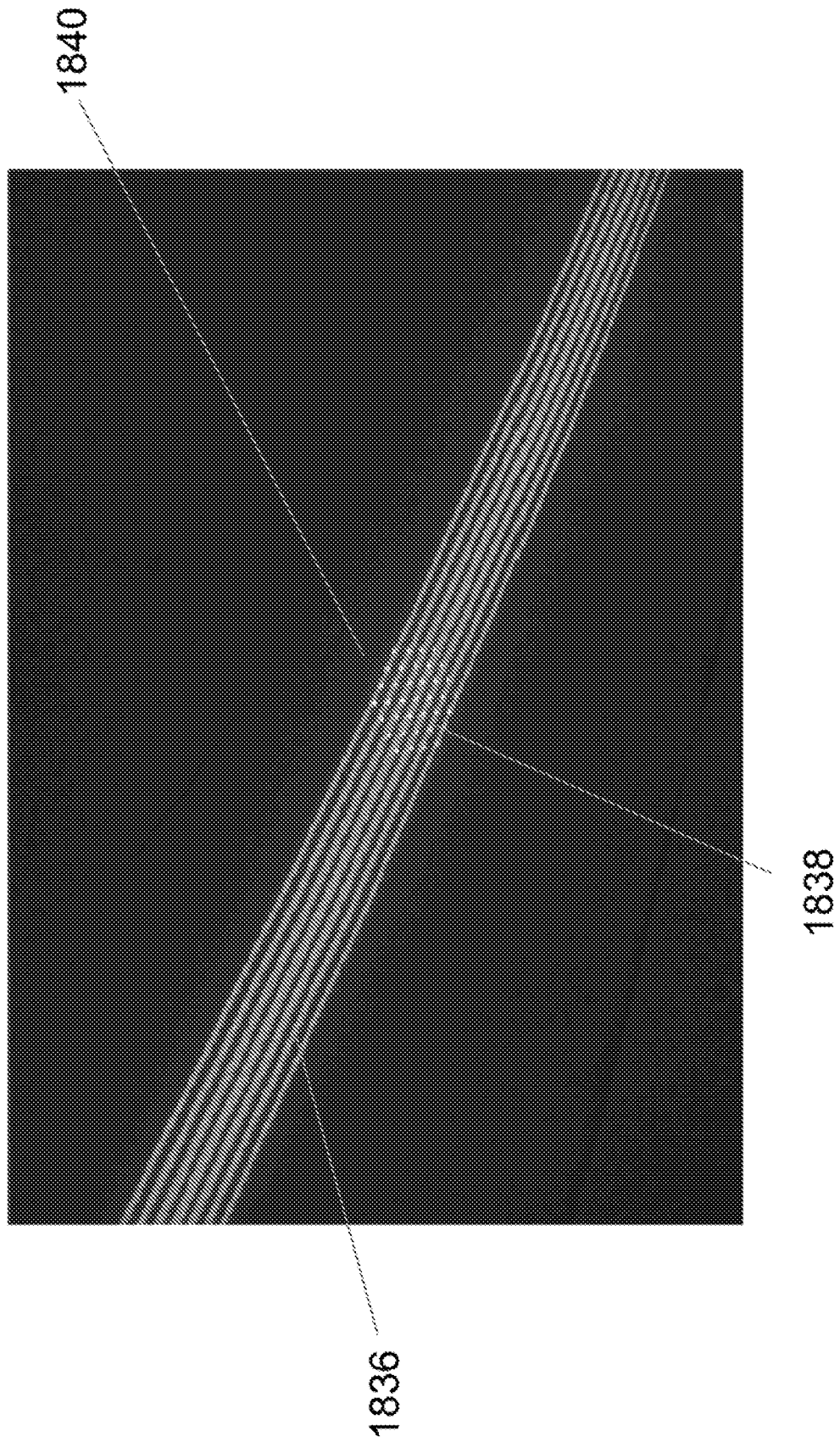
FIG. 18 illustrates an array of generated stripes of an embodiment of the coded pattern projector apparatus of the present teaching.

Referring to both FIG. 16 and FIG. 17, when the VCSEL array 1640, 1740 is setup with the lens 1631 and DOE 1632, an array of stripes is generated. FIG. 18 illustrates an array of generated stripes 1840 of an embodiment of the coded pattern projector apparatus of the present teaching. The array of generated stripes 1840 may also be referred to as an original stripe pattern. FIG. 18 also illustrates the VCSEL array emission pattern 1838 overlaid on the original stripe pattern 1840 to show the relative orientation. The stripes 1836 of the original stripe pattern 1840 are quite uniform due to the multiple VCSEL elements used for each stripe. There is a space between the stripes 1836 of the original stripe pattern 1840 which correspond to the space between the VCSEL elements.

Figure 19:
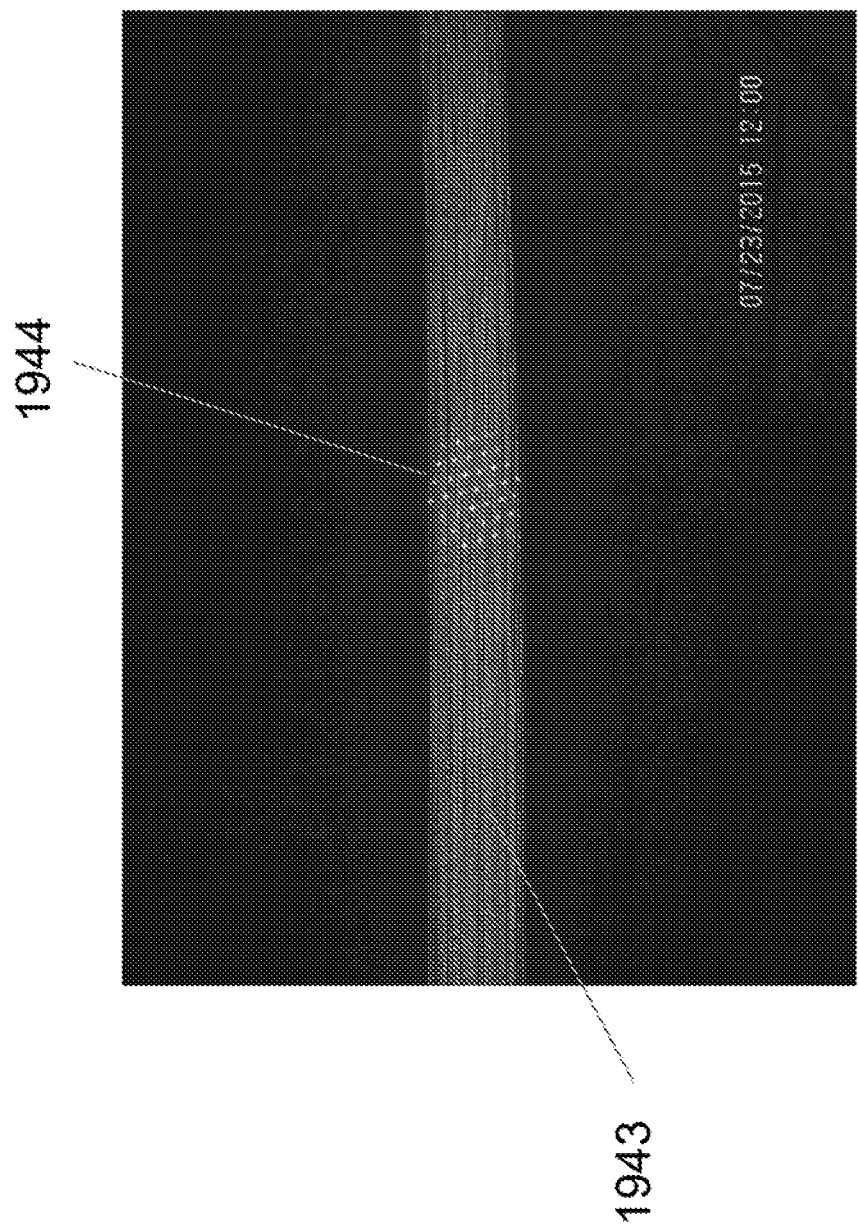
FIG. 19 illustrates a photograph of a fully-filled stripe pattern generated by an embodiment of the coded pattern projector apparatus of the present teaching.

One feature of the present teaching is that a fully-filled stripe pattern is obtained by modifying the orientation of the VCSEL array with respect to the DOE to locate VCSEL elements that produce stripes in the space or gaps between the VCSEL elements. FIG. 19 illustrates a photograph of a fully-filled stripe pattern generated by an embodiment of the coded pattern projector apparatus of the present teaching. FIG. 19 also illustrates the VCSEL array emission pattern 1944 overlaid on the fully-filled stripe pattern 1943 to show the relative orientation. In this embodiment, the VCSEL array emission pattern 1944 is rotated with respect to the DOE and generates three stripes in the gap between VCSEL element rows to generate a fully-filled stripe pattern 1943 with no gaps. FIG. 19 shows the effect of changing the alignment of the VCSEL array and the DOE to create stripes which overlap. FIG. 19 shows no gaps between the stripes in the projected coded pattern.

Figure 20:
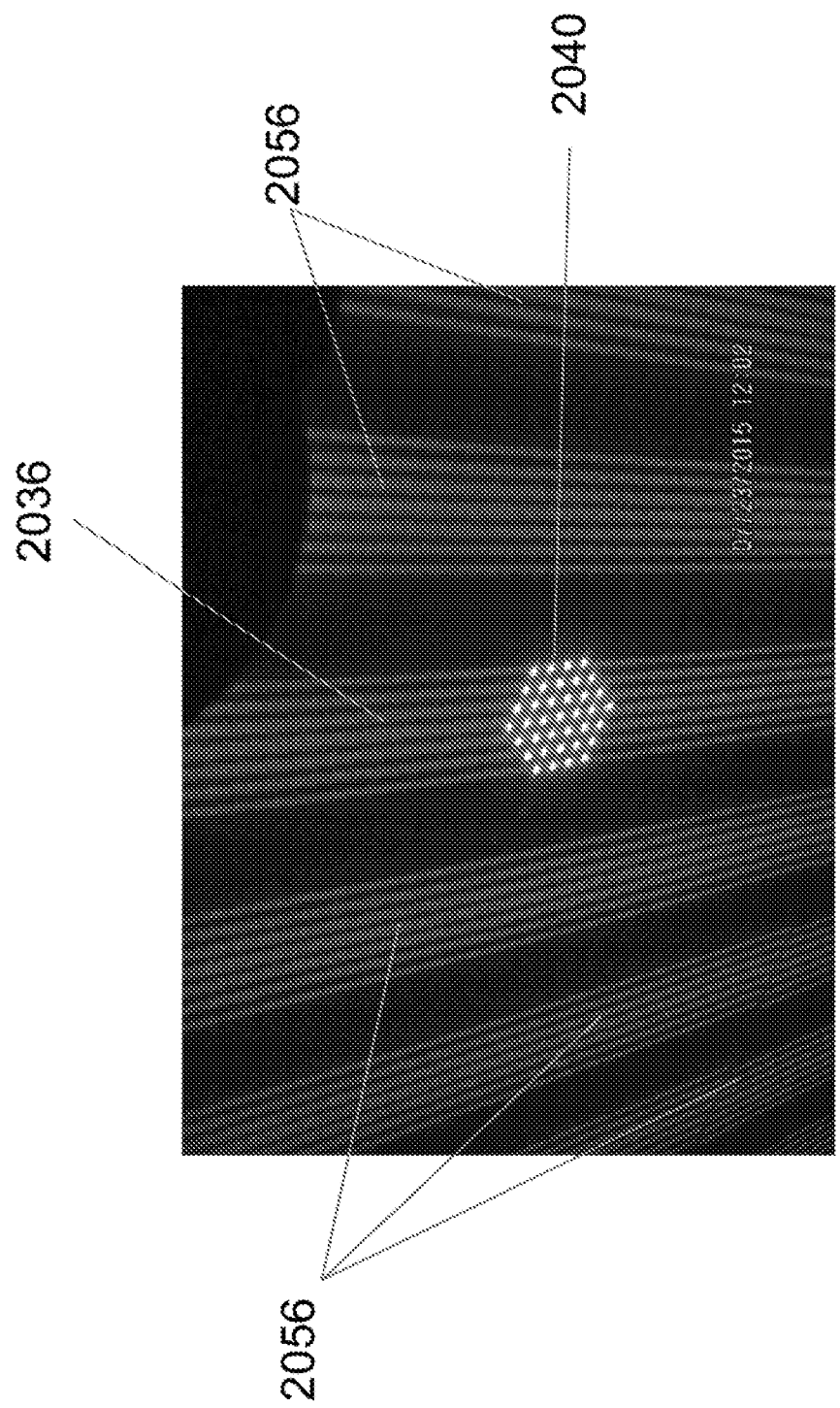
FIG. 20 illustrates a photograph of a large-field stripe pattern generated by an embodiment of the coded pattern projector apparatus of the present teaching.

One feature of the present teaching is that a stripe pattern can be expanded to fill a larger field of view. This feature was initially described above in association with the description of the embodiment of FIG. 13 that includes a second multiplier DOE. FIG. 20 illustrates a photograph of a large-field stripe pattern generated by an embodiment of the coded pattern projector apparatus of the present teaching. FIG. 20 also illustrates the VCSEL array emission pattern 2040 overlaid on the large-field stripe pattern to show the relative orientation. The VCSEL array emission pattern 2040 beams are propagated through a first DOE to form the original stripe pattern 2036. The beams are then directed through the second multiplier DOE to form replicas 2056 of the stripe pattern. In this way, a wide field of illumination in the horizontal direction perpendicular to the stripe direction is obtained. In the embodiment illustrated in FIG. 20, there is a large spacing between the replicas. As will be apparent to those skilled in the art, the replica spacing can be adjusted or even eliminated by modifying the design structure of the second multiplier DOE. In some embodiments, the second multiplier DOE projects copies with large angles, in some embodiments, the second multiplier DOE projects copies with smaller angles. The projected angle is changed by changing the DOE structure.

One feature of the present teaching is that it can be used to expand the pattern geometry from one-dimensional coded stripe patterns to two-dimensional coded patterns. In these embodiments, the pattern elements would be two-dimensional arrangements of spots or shapes instead of one-dimensional stripes. The same concepts would apply and the projector could produce a field of two-dimensional structured patterns in a coded sequence in a similar manner to the coded sequence of stripe patterns described herein.

VCSEL arrays can be fabricated as large as 10 mm square or even larger. In many cases the VCSEL array will be larger than the projection lens and larger than the DOE which are used to form the code structured pattern. As a consequence, the emitted beams near the periphery of the VCSEL array could miss the lens and DOE apertures. FIG. 21A illustrates an embodiment of the coded pattern projector apparatus and method including a micro-optic prism array 2152 of the present teaching. FIG. 21A is a side-view showing the bending of the VCSEL beams. A micro-optic prism array 2152 is placed in front of a VCSEL array 2151 to bend the output beams that would normally emit in directions shown by arrows 2119 towards the axis as shown by the solid arrows so that they pass through the aperture of the projection lens 2131.

FIG. 21B is a close-up view of three VCSEL elements showing the cross-section of the micro-optic prisms bending the VCSEL beams towards an axis that runs through the center of the VCSEL array. FIG. 21B shows details of an embodiment of the form of the micro-prism array 2152 in which the surface angle for each micro-optic prism element presented to each emitter 2100 of the VCSEL array 2151 is different. The surface angle for each micro-optic prism element presented to each emitter 2100 increases proportionally for micro-prisms further from the center of the micro-optic prism array 2152 so that the beams 2153 close to the center are bent a small amount and the beams 2153 at the periphery are bent the most so that there is an even distribution of beams through the lens aperture.

FIG. 21C illustrates a top view showing the location and shape of one micro-optic prism element with respect to one VCSEL device in the array. FIG. 21C illustrates the location of each micro-optic prism array element in relation to the VCSEL array element 2100 of the coded pattern projector apparatus of the present teaching. The prism aperture 2171 is aligned to the VCSEL element 2100 and the beam emitted by the VCSEL element and then there is an intermediate structure 2170 between the prism elements.

Figure 22:
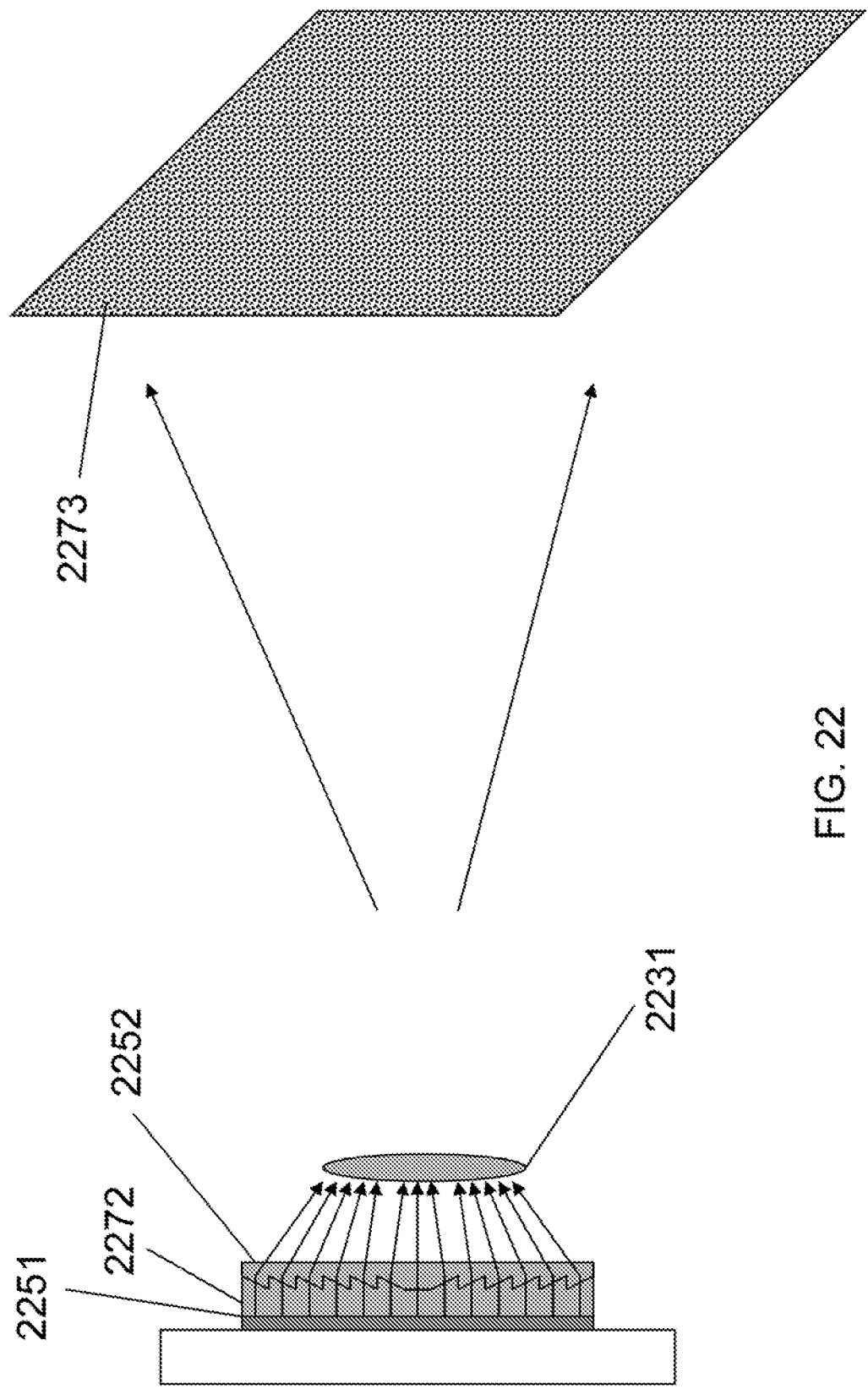
FIG. 22 illustrates an embodiment of the coded pattern projector of the present teaching that projects a coded two-dimensional structured pattern.

One feature of the coded pattern projector apparatus of the present teaching is that it can provide a coded two-dimensional structured pattern. FIG. 22 illustrates an embodiment of the coded pattern projector of the present teaching that projects a coded two-dimensional structured pattern. The VCSEL array can be a regular array pattern or a non-regular array pattern. The VCSEL elements are arranged to form a structured pattern of spots. In various embodiments, these spots may be round or some other shape. The shape of the spots is defined by the aperture shapes of the individual VCSEL elements. A projection lens 2231 projects an image of the VCSEL array to form the structured illumination pattern 2273. The VCSEL array 2251 can have all elements activated together or can be an addressable array where individual elements or groups of elements are activated separately. Activating separate elements or groups of elements in sequence generates a sequence of different coded structured patterns 2273.

The use of a large VCSEL array with the micro-optic prism array produces a large structured pattern 2273 with very many spots. Activating different VCSEL elements in sequence produces many different coded patterns suitable for complex three-dimensional imaging and depth sensing applications. The micro-optic prism array 2252 can be mounted separately from the VCSEL array or, as shown in FIG. 22, it can be directly bonded to the VCSEL array using a low index transparent bonding material 2272 for a more rugged structure.

Figure 23:
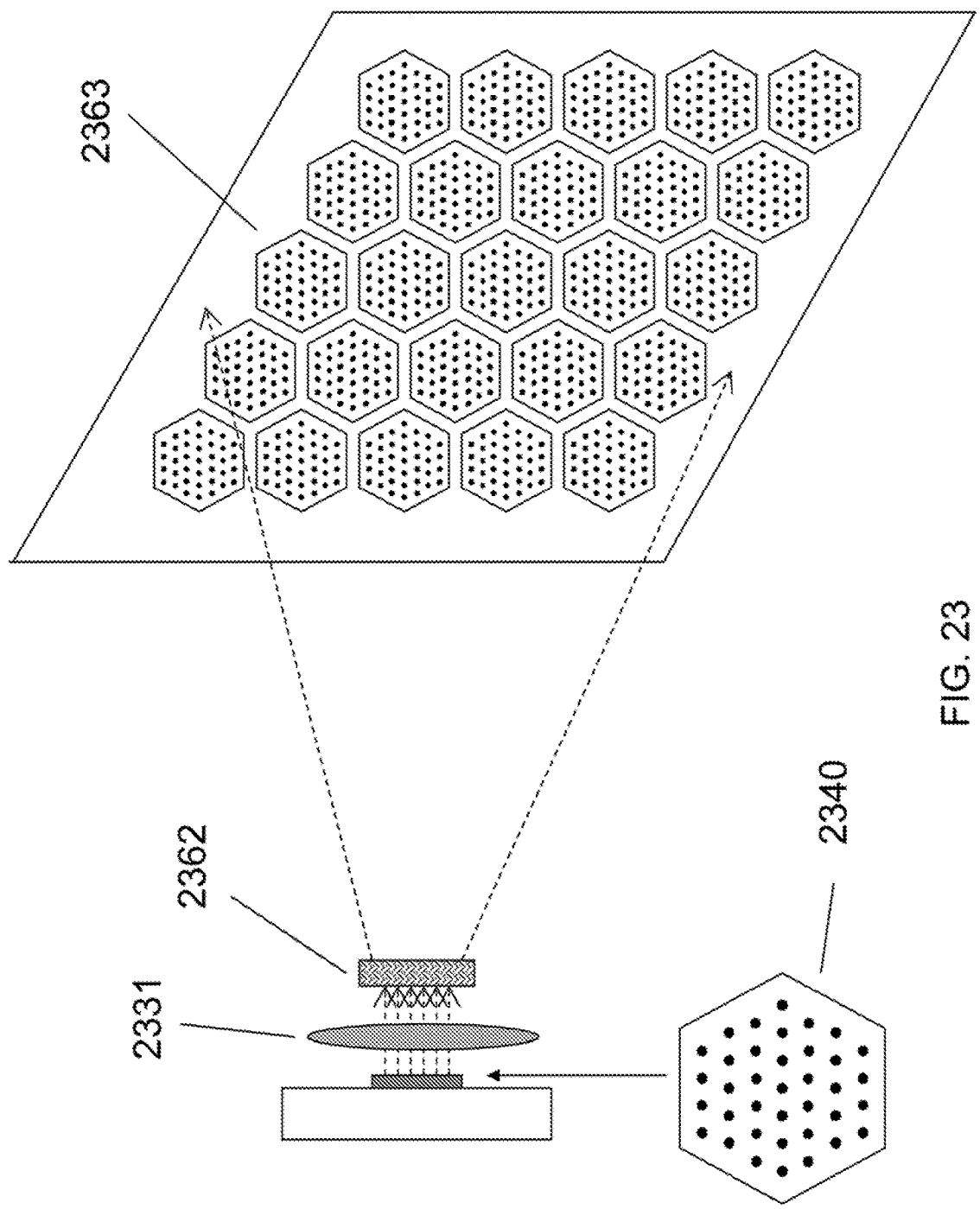
FIG. 23 illustrates an embodiment of the coded pattern projector of the present teaching that projects a large structured pattern.

One feature of the coded pattern projector apparatus and method of the present teaching is that it projects large structured patterns. FIG. 23 illustrates an embodiment of the coded pattern projector of the present teaching that projects a large structured pattern. FIG. 23 illustrates the formation of a large two-dimensional array of spots using a DOE that multiplies the two-dimensional VCSEL array output in two dimensions. The beams from a surface-emitting array with a pattern shown in inset 2340 are projected by a lens 2331 and the beams are directed at a DOE 2362. The DOE 2362 creates adjacent multiple replicas of the VCSEL beam array in two dimensions to realize a large two-dimensional structured pattern 2363. The replicas are arranged to be close together, but non-overlapping, so that the pattern is a uniform large array of spots or shapes. The surface-emitting array 2340 is fully addressable so that different beam patterns can be created by activating relevant surface-emitting elements in the surface-emitting array 2340. Thus, a coded sequence of array patterns can be projected and replicated into a large field of view in the region. In some embodiments, this sequence of different coded patterns can be projected and a camera or other 2D sensor located off-axis and used to record images of objects illuminated by these projected patterns. These embodiments may be used in applications including 3D imaging or gesture recognition applications. Analysis of the distorted spot images will provide three-dimensional depth information about the objects for 3D imaging or gesture recognition applications.

Figure 24:
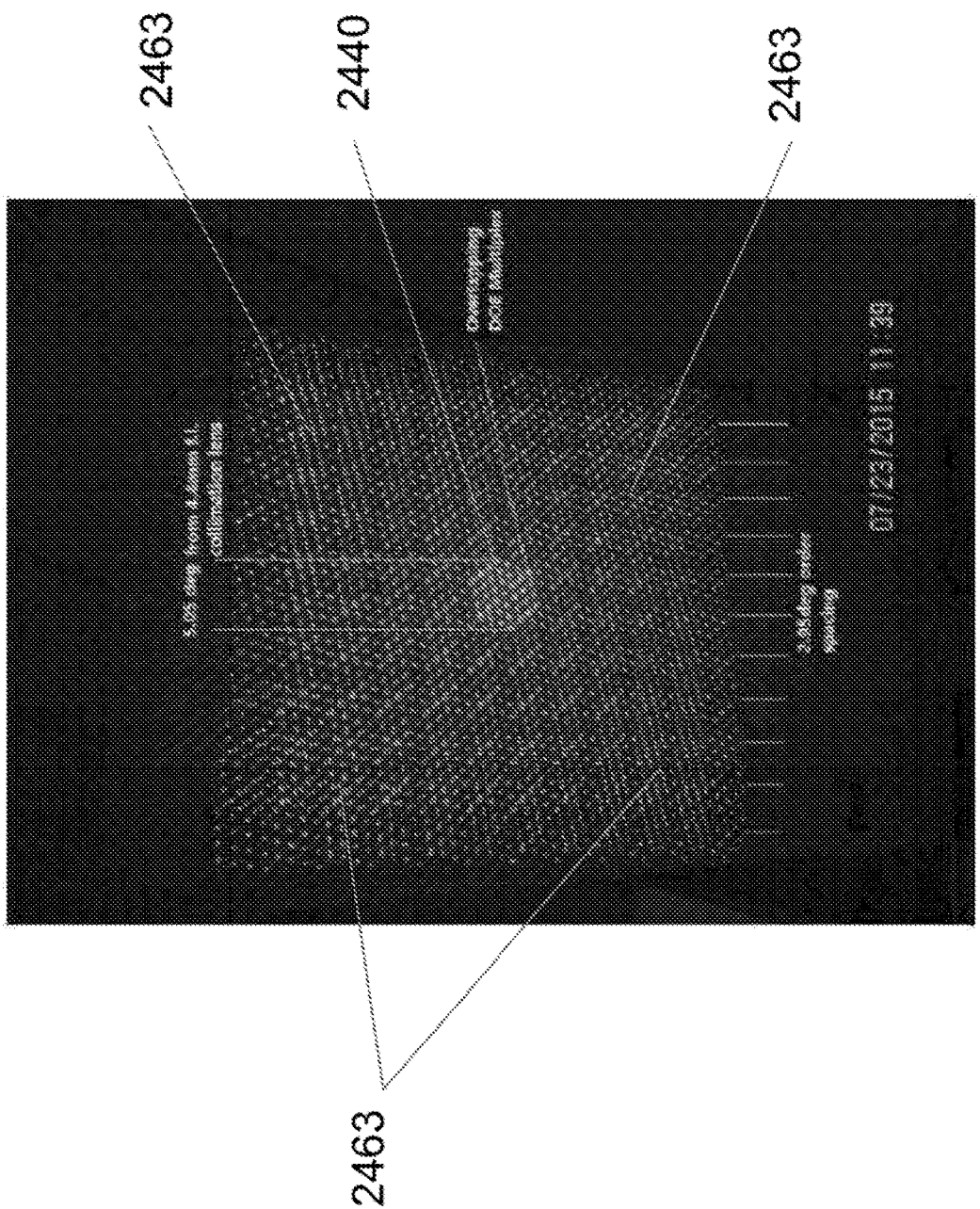
FIG. 24 illustrates a photograph of a large two-dimensional structured pattern projected by an embodiment of the coded pattern projector of the present teaching.

FIG. 24 illustrates a photograph of a large two-dimensional structured pattern projected by an embodiment of the coded pattern projector of the present teaching. The photograph of FIG. 24 depicts an embodiment of the configuration described in connection with FIG. 23. The large two-dimensional projected pattern is a large array of spots with a uniform spacing. The position of the spots from the non-diffracted image is identified in the photograph so that they can be related to the multiplied images. The original VCSEL array spot pattern 2440 is shown in the center with all the VCSEL elements activated. The DOE projected replicas 2463 of the spot pattern surround the original VCSEL array spot pattern 2440 in two dimensions. The replicas are arranged to be close together, but non-overlapping, so that the pattern is a uniform large array of spots or shapes. The photograph illustrated in FIG. 24 demonstrates a continuous and uniformly spaced array of spots covering the full field of view. A coded sequence of different pattern structures can be projected by activating different sets of VCSEL elements in the VCSEL array. These pattern structures can also be coded as a function of time by activating different sets of VCSEL elements in the VCSEL array in a particular time sequence.

Figure 25:
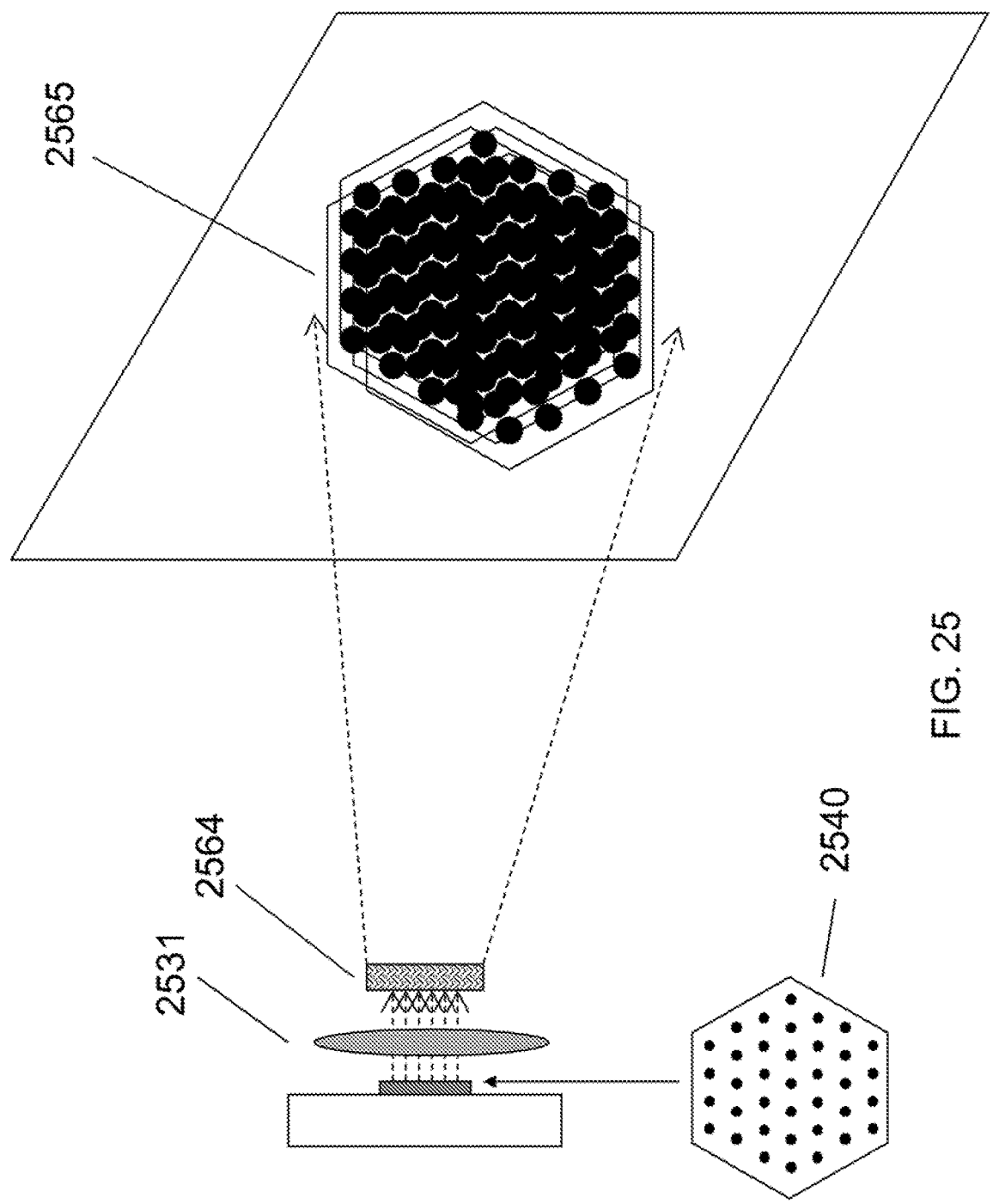
FIG. 25 illustrates an embodiment of the coded pattern projector of the present teaching that projects a fully-filled coded two-dimensional pattern structure.

One feature of the coded pattern projector apparatus and method of the present teaching is that it can project a fully-filled coded two-dimensional pattern structure. FIG. 25 illustrates an embodiment of the coded pattern projector of the present teaching that projects a fully-filled coded two-dimensional pattern structure. Specifically, FIG. 25 illustrates how a close-packed array of spots can be generated using two-dimensional DOE multiplier to interleave the projected VCSEL array images. The adjacent spots are arranged to overlap so that when all VCSEL elements are activated they coalesce into a larger spot image. In this embodiment, a DOE 2564 comprises a structure that offsets the pattern of emitted beams emerging from the surface-emitting beam array 2540 a small amount. The offset distance is approximately the emitting element beam diameter. The offsets of the structure of the DOE from the pattern of emitted beams occur in different directions. In this way, the overlapping beam spots fully fill the projected image 2565. FIG. 25 shows four overlapping replicas that are sufficient to essentially fully fill the projected image 2565. The diagram of the fully-filled projected image 2565 shows all the surface-emitting elements activated producing multiple overlapping arrays of spots covering the full field of view. A coded sequence of different pattern structures can be projected by activating different sets of surface-emitting elements in the array.

It can be appreciated by persons skilled in the art that the overlap of the beam spots can be any desired amount and is not restricted to being approximate emitting element beam diameter. The overlap of beam spots can be multiple beam diameters or non-integer array pitches. In some embodiments, an overlap of 3.3 times the array pitch in one dimension and 4.7 times the array pitch in a second dimension is used.

Figure 26:
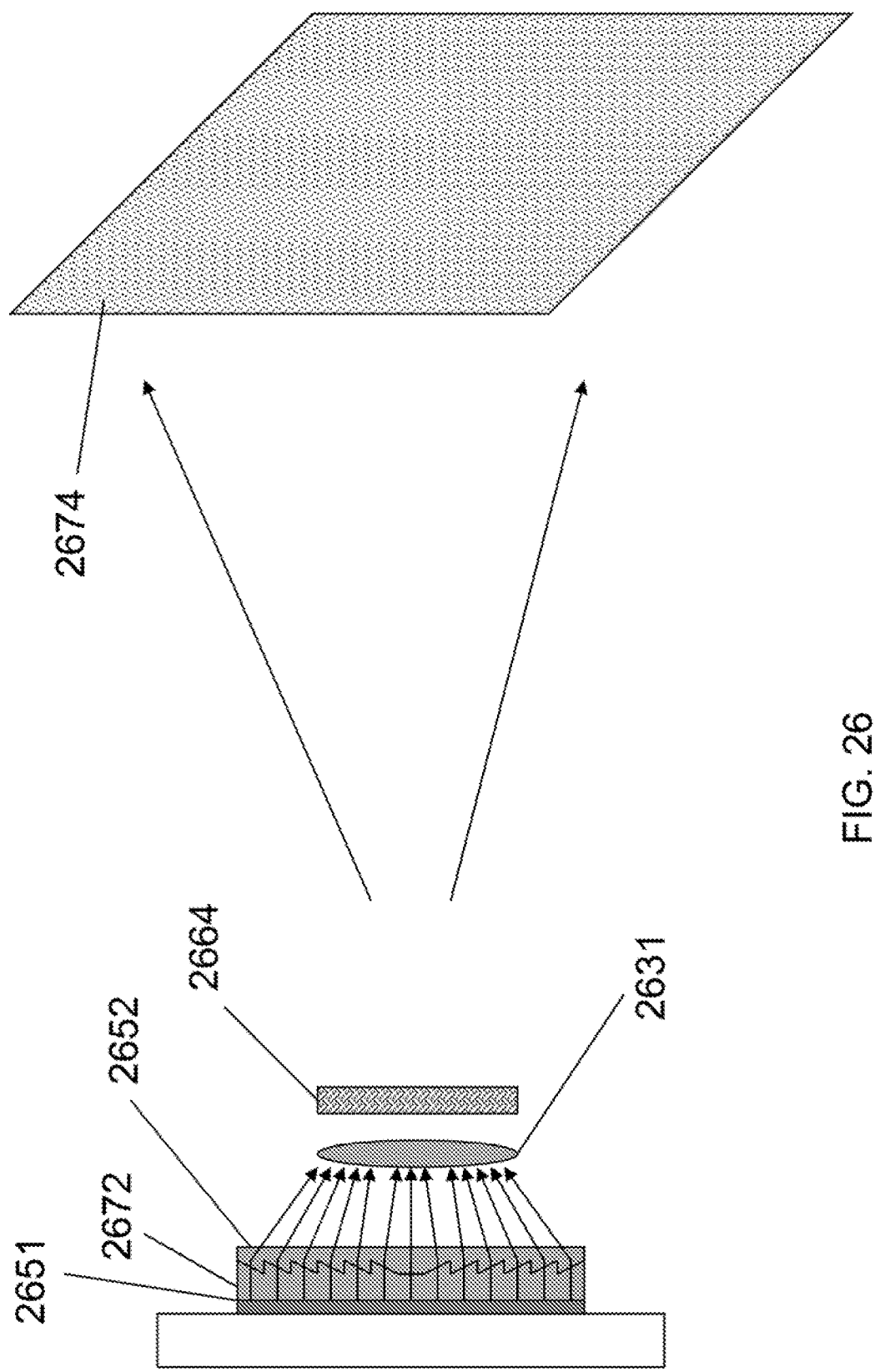
FIG. 26 illustrates an embodiment of the coded pattern projector of the present teaching that projects multiple replicas of patterns from a large VCSEL array.

One feature of the present teaching is that multiple replicas of a coded structured pattern can be projected from large VCSEL arrays. FIG. 26 illustrates an embodiment of the coded pattern projector of the present teaching that projects multiple replicas of patterns from a large VCSEL array. FIG. 26 describes the addition of a DOE to the embodiment illustrated in FIG. 22. FIG. 26 illustrates an embodiment that generates a large, and very dense array of spots. In the embodiment of FIG. 26, the output beams from a large VCSEL array 2651 are converged through a projection lens 2631 using a micro-optic prism array 2652. A DOE 2664 is located after the lens 2631 to create multiple replicas of the VCSEL structured pattern to create a single projected structured pattern 2674. In some embodiments, the multiple replicas can be arranged adjacent to each other to form a larger pattern. In some embodiments, the replicas can be interleaved to increase the pattern density and fully-fill the single projected structured pattern spaces with the replicated pattern spots.

Figure 27A:
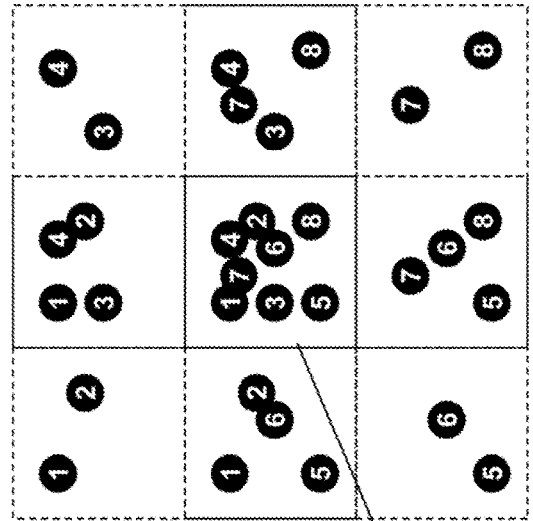
FIG. 27A illustrates a pattern of VCSEL elements of an embodiment of the coded pattern projector of the present teaching.
Figure 27B:
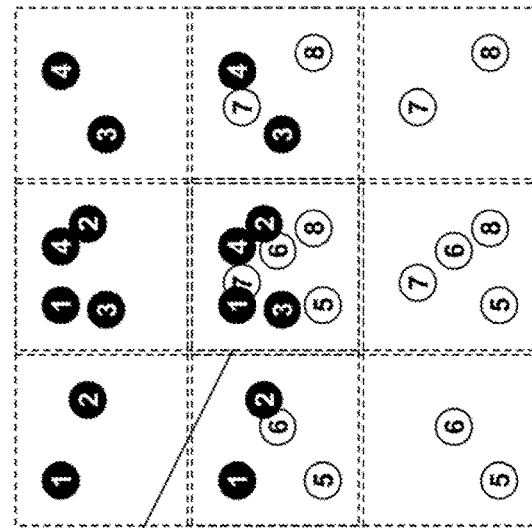
FIG. 27B illustrates a structured pattern resulting from projecting the pattern illustrated in FIG. 27A through a DOE of the present teaching.

One feature of the present teaching is that it can generate a sequence of coded structured patterns for two-dimensional projection. FIGS. 27A-D illustrate an example of creating a coded structure pattern using a VCSEL array and a two-dimensional DOE multiplier that creates the structure pattern from the overlapping images. FIG. 27A illustrates a pattern of VCSEL elements of an embodiment of the coded pattern projector of the present teaching. FIG. 27B illustrates a structured pattern resulting from passing the beams from the pattern of VCSEL elements of FIG. 27A through a DOE. FIG. 27A shows a VCSEL array pattern 2766 comprising eight emitting elements. In this case, the VCSEL array is not a regular array but the location of the emitting elements 2767 is in a structured, non-regular array layout pattern. The surface-emitting array layout pattern of FIG. 27A, with all the elements activated, is projected through a DOE that generates four replicas with an offset that is ¼ the size of the array size. This results in a center pattern 2768 shown in FIG. 27B that is the overlap of the four quadrants of the VCSEL array chip 2766 of FIG. 27A. Each VCSEL element spot is numbered for clarity so that the location of the overlapping spots can be identified. For example the array elements labeled 1-8 in FIG. 27A correspond to the spots in the structured pattern with the same number. That is, light from element labeled "1" in FIG. 27A appears as multiple spots labeled "1" when projected by the DOE and shown in FIG. 27B. Some of the emitter spots overlap to generate a larger spot with no gap. It should be noted that only a limited number of surface emitting elements were used in the illustrations shown in FIGS. 27A-B for clarity in understanding. It would be apparent to persons skilled in the art that by using a larger number of emitting elements appropriately spaced that full coverage of the projected pattern can be obtained.

Figure 27C:
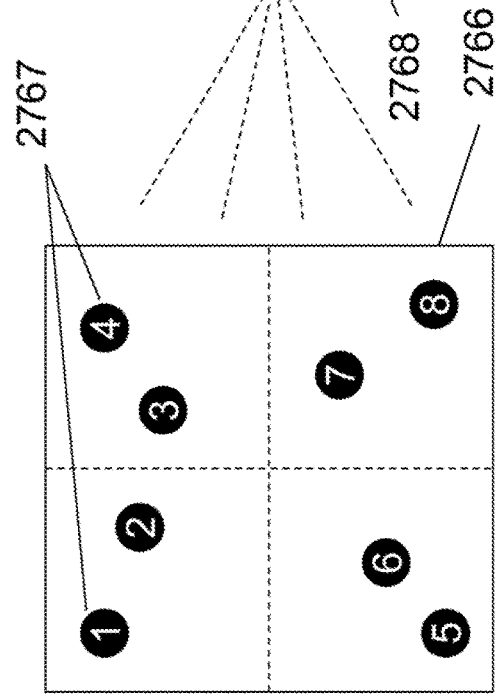
FIG. 27C illustrates a pattern of VCSEL elements of an embodiment of the coded pattern projector of the present teaching.
Figure 27D:
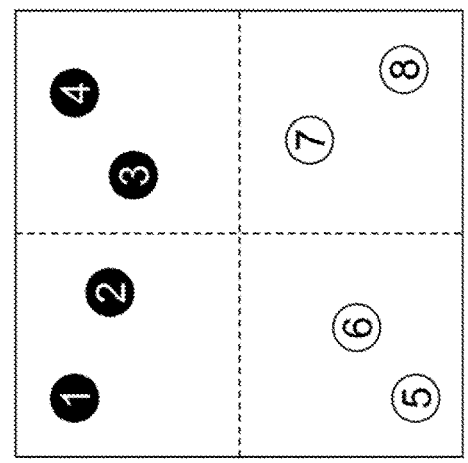
FIG. 27D illustrates a coded structured pattern resulting from projecting the beams from the pattern of VCSEL elements of FIG. 27C through a DOE of the present teaching.

FIG. 27C illustrates a pattern of VCSEL elements of an embodiment of the coded pattern projector of the present teaching. FIG. 27D illustrates a structured pattern resulting from passing the beams from the pattern of VCSEL elements of FIG. 27C through a DOE of the present teaching. FIG. 27C shows that half of the surface-emitting elements are not activated as illustrated by the open circles. FIG. 27D shows the resulting overlaid structured pattern which has a different structure from that illustrated in FIG. 27B. It will be apparent to persons skilled in the art that many different pattern codes can be generated by activating different sets of surface emitting elements in sequence. Thus, a sequence of different coded patterns can be projected and a camera or other 2D sensors located off-axis used to record images of objects illuminated by these projected patterns. This embodiment of the present teaching can be used in 3D imaging or gesture recognition applications. Analysis of the distorted spot images will provide three-dimensional depth information about the objects for 3D imaging or gesture recognition applications.

In the embodiments illustrated in FIGS. 27A-D, an overlap of ¼ the surface-emitting array chip size was used. In various embodiments, various other overlap proportions can be used to obtain different pattern structures with different levels of complexity. In addition, in some embodiments, the DOE can be designed to create multiple replicas which will generate multiple copies of the overlap pattern 2766. Some embodiments include a DOE that is designed to create more than four replicas. This overlap and number of replicas are exemplary. Many other combinations are possible and will be apparent to those persons skilled in the art.

One feature of the coded pattern projector apparatus and method of the present teaching is that it can project multiple fully-filled coded two-dimensional pattern structures into a large area in the region. FIG. 28 illustrates an embodiment of the coded pattern projector of the present teaching that projects multiple fully-filled coded two-dimensional pattern structures into a large area. FIG. 28 illustrates the use of a second multiplier DOE to increase the image filed of the interleaved array that is illustrated in FIG. 25. The replicated patterns are butted together so that the total projected pattern is fully-filled when all the surface emitters are activated. A first DOE 2864 generates a fully-filled coded two-dimensional pattern. A second multiplier DOE 2875 is placed after the first DOE 2862 to project adjacent replicas 2869 of the fully-filled coded two-dimensional pattern. These adjacent replicas 2869 can be placed slightly overlapped by appropriate design of the second multiplier DOE 2875 structure to produce a completely fully-filled expanded structured pattern.

From the descriptions provided in the previous sections, it can be appreciated that the principles of the present teaching may be applied to construct a wide range of sequentially coded patterns, both one-dimensional stripe patterns and two-dimensional spot patterns. The surface-emitting arrays can also be coupled with microlens arrays or micro-prism arrays, which allows more flexibility in collimation, projection and focusing of the surface emitter beams.

The surface-emitting array with the lens and DOE(s) makes them very compatible with a wide range of electronic module assembly processes and they can be assembled with surface mount module emitting arrays into modules with sensors and IC devices. The modular and surface mount aspects of the design are particularly attractive for reducing manufacturing cost by producing the modules in large volumes. Since surface-emitting arrays can be constructed using different materials, different wavelength emission devices may be combined together in a modular fashion to create a multi-wavelength module. These and other advantages of the principles disclosed here will be apparent to those skilled in the art.

Although a broad framework of the present teaching is described with reference to a few particular embodiments, other embodiments may be configured by applying combinations and sub-combinations of elements described herein, depending on particular surface emitting structured illumination application. Variations and modifications of different embodiments that will be apparent to those skilled in the art are within the scope of the invention and are covered by appended claims.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

We claim:
1. A coded pattern projector apparatus comprising:
a surface-emitting array of emitters comprising a plurality of emitters, each of the plurality of emitters operable to generate one of a plurality of optical beams in response to an electrical drive signal applied to a respective electrical input of each of the plurality of emitters;
a first optical element positioned in an optical path of the plurality of optical beams generated by the surface-emitting array of emitters, the first optical element operable to project each of the plurality of optical beams generated by the surface-emitting array of emitters;
a second optical element that is positioned in the optical path of the plurality of optical beams, the second optical element operable to collimate the plurality of optical beams in a first dimension and operable to diverge the plurality of optical beams in a second dimension such that the plurality of optical beams form a pattern; and a controller having a plurality of electrical outputs, each of the plurality of electrical outputs being connected to the respective electrical input of each of the plurality of emitters, the controller operable to generate electrical drive signals so as to produce the pattern.

2. The coded pattern projector apparatus of claim 1 wherein the surface-emitting array of emitters is a regular array.

3. The coded pattern projector apparatus of claim 1 wherein the surface-emitting array of emitters is a non-regular array.

4. The coded pattern projector apparatus of claim 1 wherein the surface-emitting array of emitters is configured as a commonly activated array.

5. The coded pattern projector apparatus of claim 1 wherein the surface-emitting array of emitters is configured as individual-addressable emitters.

6. The coded pattern projector apparatus of claim 1 wherein the surface-emitting array of emitters is configured as group-addressable emitters.

7. The coded pattern projector apparatus of claim 1 wherein the surface-emitting array of emitters is configured in a regular geometric pattern.

8. The coded pattern projector apparatus of claim 1 wherein the surface-emitting array of emitters is configured in a non-regular random pattern.

9. The coded pattern projector apparatus of claim 1 wherein the emitters of the surface-emitting array are arranged to form a circular array.

10. The coded pattern projector apparatus of claim 1 wherein the pattern formed by the plurality of optical beams after passing through the first and second optical elements includes a spot pattern.

11. The coded pattern projector apparatus of claim 1 wherein the pattern formed by the plurality of optical beams after passing through the first and second optical elements includes a fringe pattern.

12. The coded pattern projector apparatus of claim 1 wherein the pattern formed by the plurality of optical beams after passing through the first and second optical elements includes a stripe pattern.

* * * * *